(12) United States Patent
Guilfoyle et al.

(10) Patent No.: US 7,784,576 B2
(45) Date of Patent: Aug. 31, 2010

(54) SELECTIVE CLOSING OF AT LEAST ONE VEHICLE OPENING AT A FRONT PORTION OF A VEHICLE

(75) Inventors: Matthew Guilfoyle, Portland, OR (US); Carl Trabant, Lake Oswego, OR (US); Changhyun Shin, Atlanta, GA (US); Michael von Mayenburg, Lake Oswego, OR (US)

(73) Assignee: Daimler Trucks North America LLC, Portland, OR (US)

( * ) Notice: Subject to any disclaimer, the term of this patent is extended or adjusted under 35 U.S.C. 154(b) by 0 days.

(21) Appl. No.: 12/257,978

(22) Filed: Oct. 24, 2008

(65) Prior Publication Data

US 2009/0050385 A1 Feb. 26, 2009

Related U.S. Application Data

(63) Continuation of application No. 11/211,331, filed on Aug. 24, 2005.

(60) Provisional application No. 60/623,159, filed on Oct. 29, 2004.

(51) Int. Cl.
  *B60K 11/00* (2006.01)
(52) U.S. Cl. .................. 180/68.1; 296/180.1; 123/41.04
(58) Field of Classification Search ................ 180/68.1, 180/68.2; 701/36; 165/98; 123/41.04, 41.05, 123/41.06; 296/180.1, 193.1
See application file for complete search history.

(56) References Cited

U.S. PATENT DOCUMENTS

| | | | |
|---|---|---|---|
| 1,114,246 A | 10/1914 | Furber | |
| 1,257,218 A | 2/1918 | Griswold | |
| 2,162,526 A | 6/1939 | Buyck | |
| 2,170,524 A | 8/1939 | Agerell et al. | |
| 2,174,358 A | 9/1939 | Blumenthal | |
| 2,248,544 A | 7/1941 | Maruhn | |
| 2,329,874 A | 11/1941 | Cadwallader et al. | |
| 2,276,279 A | 3/1942 | Asklund | |
| 2,783,978 A | 3/1957 | Baumgarten | |
| 3,792,889 A | 2/1974 | Fuerner et al. | |

(Continued)

FOREIGN PATENT DOCUMENTS

DE 3905349 A1 9/1989

(Continued)

OTHER PUBLICATIONS

Claims as filed in Amendment dated Mar. 11, 2009 for U.S. Appl. No. 11/211,331, filed Aug. 24, 2005.

(Continued)

*Primary Examiner*—Hau V Phan
*Assistant Examiner*—Jacob Meyer
(74) *Attorney, Agent, or Firm*—Klarquist Sparkman, LLP

(57) ABSTRACT

Mechanisms are described for selectively closing grille and/or bumper openings. These mechanisms may be operated in response to one or more vehicle parameters. Closure mechanism control signals may be delivered to such mechanisms along a vehicle databus. In addition, vehicle parameters used in determining the control of such mechanisms may be sensed and provided along the databus to a controller which then processes the parameter information for determining whether to open or close the vehicle grille closing mechanism and/or the vehicle bumper opening closing mechanism.

12 Claims, 14 Drawing Sheets

U.S. PATENT DOCUMENTS

| | | | |
|---|---|---|---|
| 4,102,548 A | | 7/1978 | Kangas |
| 4,410,032 A | | 10/1983 | Mori |
| 4,429,666 A | | 2/1984 | Surace et al. |
| 4,457,558 A | | 7/1984 | Ishikawa |
| 4,489,806 A | | 12/1984 | Shimomura |
| 4,534,506 A | * | 8/1985 | Ishida et al. ............... 236/35.3 |
| 4,558,897 A | | 12/1985 | Okuyama et al. |
| 4,611,796 A | | 9/1986 | Orr |
| 4,753,468 A | | 6/1988 | Szymczak et al. |
| 4,770,457 A | | 9/1988 | Tomforde |
| 4,779,577 A | * | 10/1988 | Ritter et al. ............. 123/41.05 |
| 4,810,022 A | | 3/1989 | Takagi et al. |
| 4,924,826 A | * | 5/1990 | Vinson .................. 123/195 C |
| 4,938,303 A | | 7/1990 | Schaal et al. |
| 5,205,484 A | | 4/1993 | Susa et al. |
| 5,269,264 A | * | 12/1993 | Weinhold ............... 123/41.05 |
| 5,317,880 A | | 6/1994 | Spears |
| 5,458,391 A | | 10/1995 | Ito et al. |
| 5,490,572 A | | 2/1996 | Tajiri et al. |
| 5,732,666 A | * | 3/1998 | Lee ......................... 123/41.05 |
| 5,735,137 A | | 4/1998 | Kim |
| 5,876,088 A | | 3/1999 | Spears |
| 6,079,769 A | | 6/2000 | Fannin et al. |
| 6,209,947 B1 | | 4/2001 | Rundels |
| 6,230,832 B1 | | 5/2001 | von Mayenburg |
| 6,527,333 B2 | | 3/2003 | Hewitt et al. |
| 6,695,047 B2 | * | 2/2004 | Brocksopp ................. 165/292 |
| 6,926,346 B1 | | 8/2005 | Wong et al. |
| 6,979,050 B2 | | 12/2005 | Browne et al. |
| 7,113,855 B2 | | 9/2006 | Seidel |
| 7,497,287 B2 | | 3/2009 | Kunikata et al. |
| 7,498,926 B2 | | 3/2009 | Browne et al. |
| 2003/0029581 A1 | * | 2/2003 | Vide .......................... 160/201 |
| 2005/0023057 A1 | | 2/2005 | Maeda et al. |
| 2005/0029027 A1 | | 2/2005 | Kunikata et al. |
| 2006/0060401 A1 | | 3/2006 | Bole |
| 2006/0095178 A1 | | 5/2006 | Guilfoyle et al. |
| 2008/0133090 A1 | | 6/2008 | Browne et al. |

FOREIGN PATENT DOCUMENTS

| | | |
|---|---|---|
| DE | 3916907 A1 | 12/1989 |
| EP | 0236216 | 9/1987 |
| FR | 2629765 A1 | 10/1989 |
| GB | 2131150 | 6/1984 |

OTHER PUBLICATIONS

Office Action mailed Dec. 11, 2008 for U.S. Appl. No. 11/211,331, filed Aug. 24, 2005.
Notice of Allowance and Fee(s) Due dated Jul. 10, 2009, issued in co-pending U.S. Appl. No. 11/211,331, filed Aug. 24, 2005.
English language abstract of EP0236216 (Derwent).
English language abstract of EP0236216 (espace.net).
Office Action mailed Feb. 12, 2008 for U.S. Appl. No. 11/211,330, filed Aug. 24, 2005.

* cited by examiner

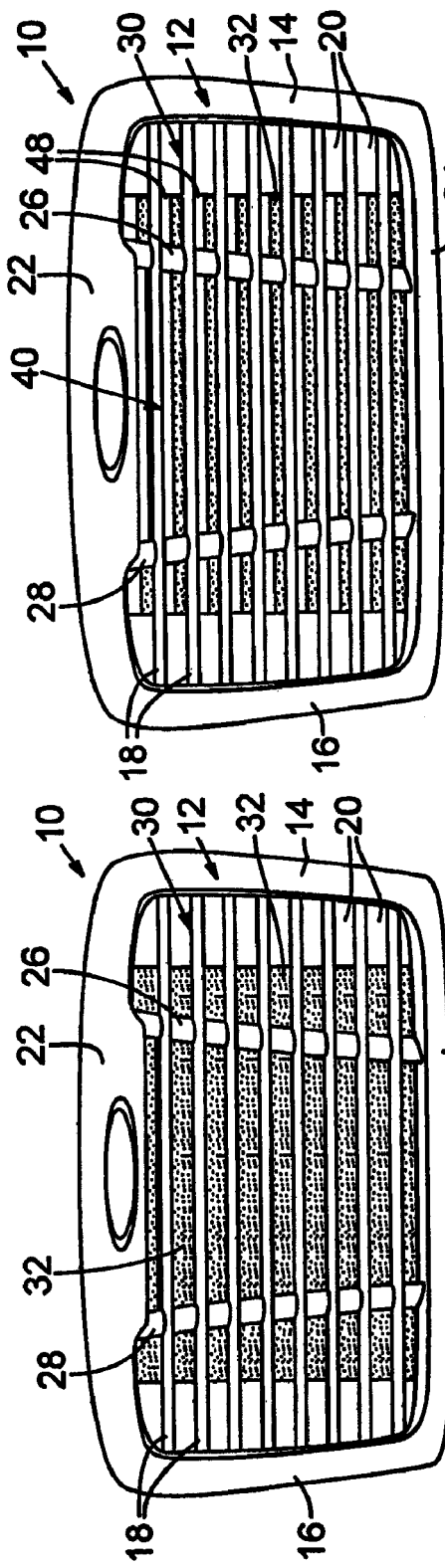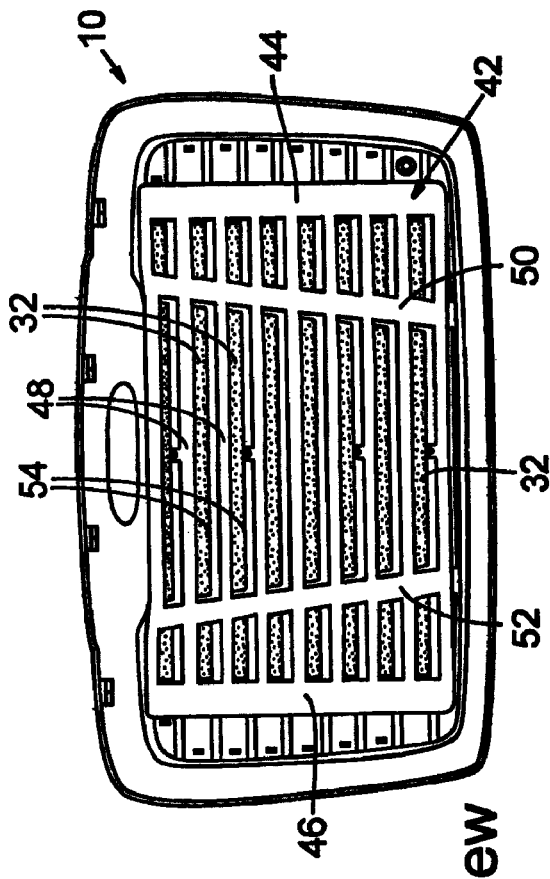

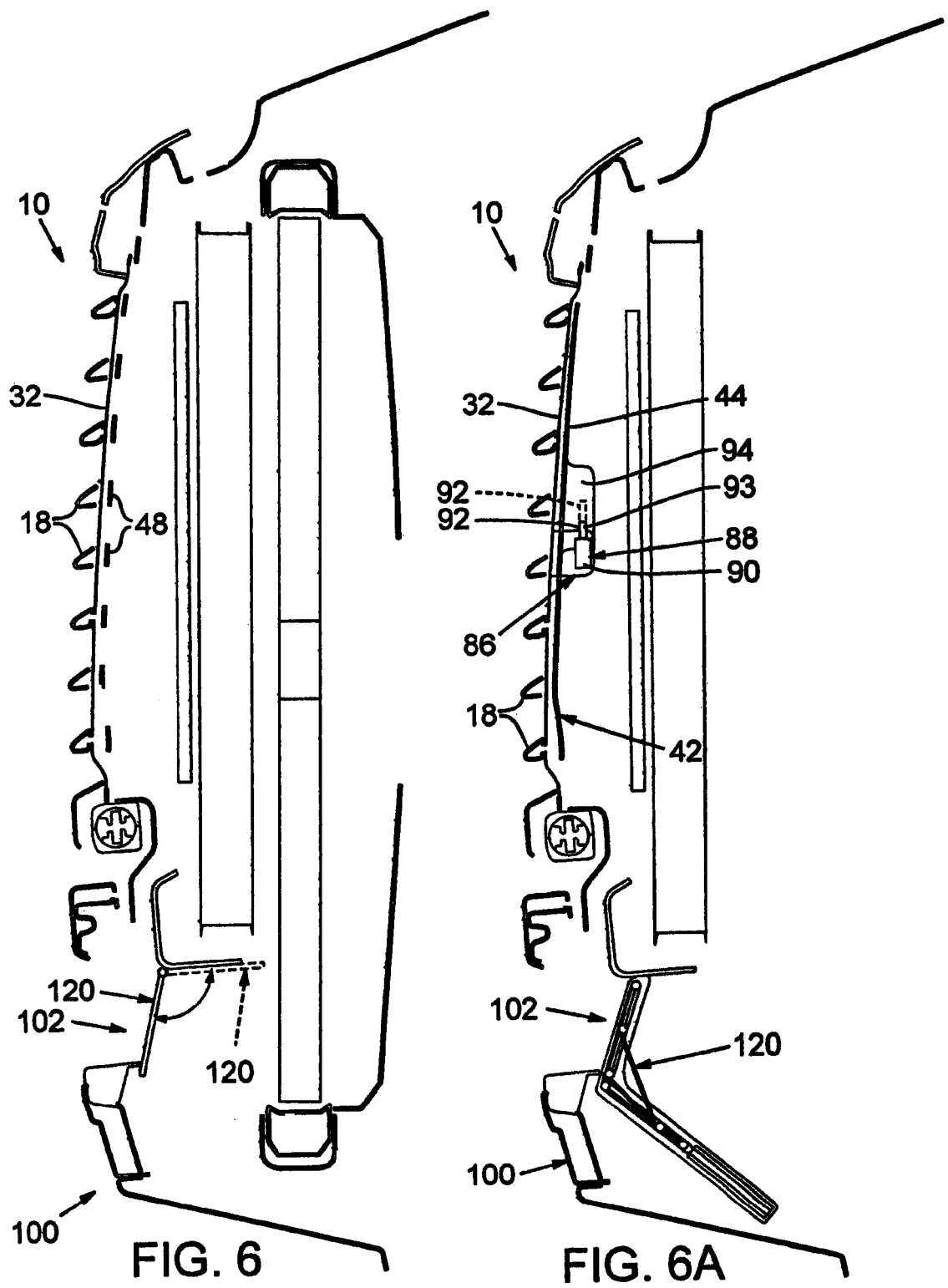

SELECTIVE CLOSING OF AT LEAST ONE VEHICLE OPENING AT A FRONT PORTION OF A VEHICLE

RELATED APPLICATION DATA

This application is a continuation of U.S. patent application Ser. No. 11/211,331, filed Aug. 24, 2005, which claims the benefit of U.S. provisional patent application No. 60/623,159, filed Oct. 29, 2004, entitled, "Selective Closing Of Grill And Bumper Openings Of A Vehicle", which is hereby incorporated by reference.

BACKGROUND

Vehicles, such as trucks or tractors for semis, are often provided with a bumper having a central or other opening to permit air to flow into lower regions of an engine compartment for cooling purposes. Also, such vehicles typically have a grille positioned over a large central opening at the front of the vehicle. The front grille opening is provided to allow the admission of air into the vehicle engine compartment for purposes such as providing engine cooling. Bug screens, which still permit the passage of air therethrough, are typically provided behind the grille opening.

These openings, although desirable for admitting air for engine cooling and other purposes, also add to the drag on the vehicle. That is, air enters such openings rather than being deflected along the aerodynamically contoured surfaces of the vehicle. The increased drag results in fuel usage inefficiencies (e.g., increased fuel consumption).

SUMMARY

It would be desirable to selectively close or partially close the grille openings depending upon engine and/or vehicle operating conditions to reduce the drag when less air flow is required to the engine. Similarly, it would be desirable to selectively close the bumper opening or openings either partially or entirely depending upon such operating conditions. By independently controlling the closure mechanisms that close the grille opening(s) and those that close the bumper opening(s), each such closure mechanism may be responsive to different operating conditions. It would also be desirable to automatically control such closure mechanisms in response to such operating conditions. The disclosure encompasses providing either a grille opening closure mechanism, a bumper opening closer mechanism, or both for a vehicle.

Disclosed herein are various embodiments of selective grille and bumper opening closure mechanisms. Also disclosed are embodiments of exemplary controls for operating grille and bumper opening closure mechanisms. It should be understood that the invention is not limited to the embodiments disclosed herein or to any specific combination or sub-combination of features or method acts. Instead, the invention is directed toward all novel and non-obvious aspects of selective grille opening and bumper opening closure mechanisms and control mechanisms and methods disclosed herein, both alone and in various combinations and sub-combinations with one another.

DESCRIPTION OF THE DRAWINGS

FIG. 2 is a front view of the grille of FIG. 1 with a grille closure mechanism shown in an open position such that the grille is in its most unblocked or open position.

FIG. 3 is a front view of the grille of FIG. 2 with one form of a grille closure mechanism shown in a closed position during which openings between grille bars of the grille are at least partially closed by the mechanism.

FIG. 4 is a rear view of the grille of FIG. 2 illustrating an exemplary form of a grille closure mechanism, in this case a slide mechanism such as an air flow regulator, for selectively and at least partially closing the openings between grille bars of the grille when the air flow regulator is moved to an engaged or closed position.

FIG. 6 is a schematic vertical sectional view of an exemplary portion of a vehicle illustrating one form of grille closing mechanism and one form of bumper closing mechanism.

FIG. 6A is a schematic vertical section view of an exemplary portion of a vehicle illustrating a form of a grille closing mechanism and an alternative form bumper closing mechanism.

DETAILED DESCRIPTION

Figure 1:
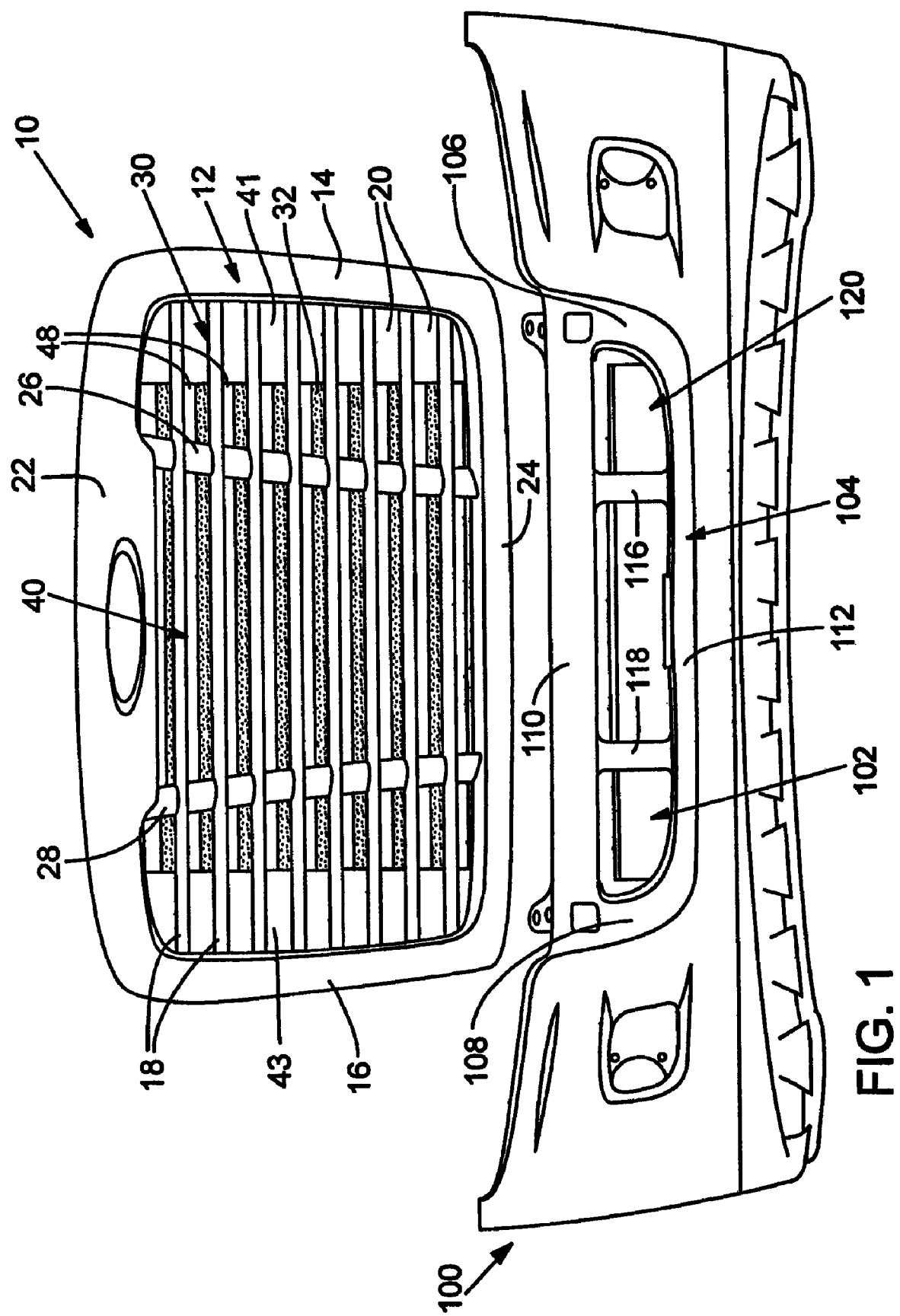
FIG. 1 illustrates one form of a grille and bumper for a truck or semi-tractor with exemplary grille opening and bumper opening closure mechanisms.

FIG. 1 illustrates an exemplary grille 10 having a surrounding portion 12 with first and second side portions 14,16. A plurality of grille bars, some of which are indicated by the number 18 in FIG. 1, extend between the respective side members 14,16 and are spaced apart from one another to provide gaps, some being indicated at 20, between adjacent grille bars 18. The illustrated grille bars 18 are horizontal and parallel to one another. The upper and lowermost grille bars are spaced from respective upper and lower portions 22,24 of the grille surround 12. In the grille shown in FIG. 10, upright grille reinforcing bars 26,28 are positioned on opposite sides of the vertical centerline of the grille to provide support for central portions of the respective grille bars 18. The grille surround 12 defines a grille opening 30 overlaid in part by the grille bars 18 and vertical supports 26,28.

Desirably, a bug screen 32 is positioned behind the grille opening to prevent bugs and other debris from passing through the grille opening and into an engine compartment therebehind. Portions of the grille opening 30 can be blocked by vehicle/grille structure located behind the grille. In the embodiment of FIG. 1, the portions of grille 10 along the side portions 14,16 and respectively to the right and left of the bug screen 32 in FIG. 1, overlay structure 41,43 that partially blocks the grille openings. The stippled area in FIG. 1 represents the bug screen 32.

One form of exemplary grille closing mechanism is shown in FIG. 1, in the form of an air flow regulating member 40 described in greater detail below. The air flow regulating member 40 is selectively operable to at least partially close the gaps between the grille bars of the open section of the grille. In one specific form, the air flow regulating member 40 comprises a slide member, such as a plate-like air flow regulator 42 (see FIG. 4 which depicts one form of the air flow regulator 42), slidably mounted to or coupled to the rear of the grille 10, or slidably supported by the grille or other structure, for sliding movement relative to the grille.

The illustrated air flow regulator 42 of FIG. 4 has side portions 44,46, which in this case are vertically oriented, and a plurality of slat portions, two of which are indicated by the number 48 in FIG. 4. The exemplary slat portions 48 extend between the side portions 44,46. In the embodiment of FIG. 4, upright support reinforcing portions 50,52 are also provided. These reinforcement portions 50,52 are desirably hidden behind grille uprights 26,28. The term, "hidden behind" means positioned in the wind shadow of the corresponding grille components. The slats 48, in the form shown, are parallel to one another and are spaced apart to provide gaps therebetween. Two such gaps 54 are indicated in FIG. 4. Desirably, the heights of the respective slats 48 (that is the distance between the lower edge and upper edge of a slat) is no greater than the height of the corresponding grille bars. As a result, each of the slats desirably can be entirely hidden behind a respective associated grille bar when the air flow regulator is shifted to a disengaged or grille open position. Although variable, in some styles of conventional grilles, the gaps 20 between grille bars 18 are greater than the height of the grille bars. Consequently, in the case of an air flow regulator with slats 48 having a height which matches or is less than the height of the associated grille bars, when the air flow regulator is moved to its engaged or grille opening blocking position, each air flow regulator slat only partially blocks the gap between a pair of grille bars. This can be seen for example in FIG. 1 where the slats 48 are shown positioned in the gaps 20 between grille bars with a portion of the bug screen 32 still being visible in such gaps. This is also shown in FIG. 3. Grille bars of a greater height can also be used.

In the case of grilles having upright or vertical spaced apart grille bars with upright or vertical gaps therebetween, an exemplary air flow regulator would desirably have upright or vertical slats with the air flow regulator desirably having slides in a sideways or horizontal direction between open and closed positions.

FIG. 2 illustrates the grille closure mechanism in an unengaged or open position. In FIG. 2, the air flow regulator slats 48 are not visible because they are hidden behind the associated grille bars 18.

Figure 5:
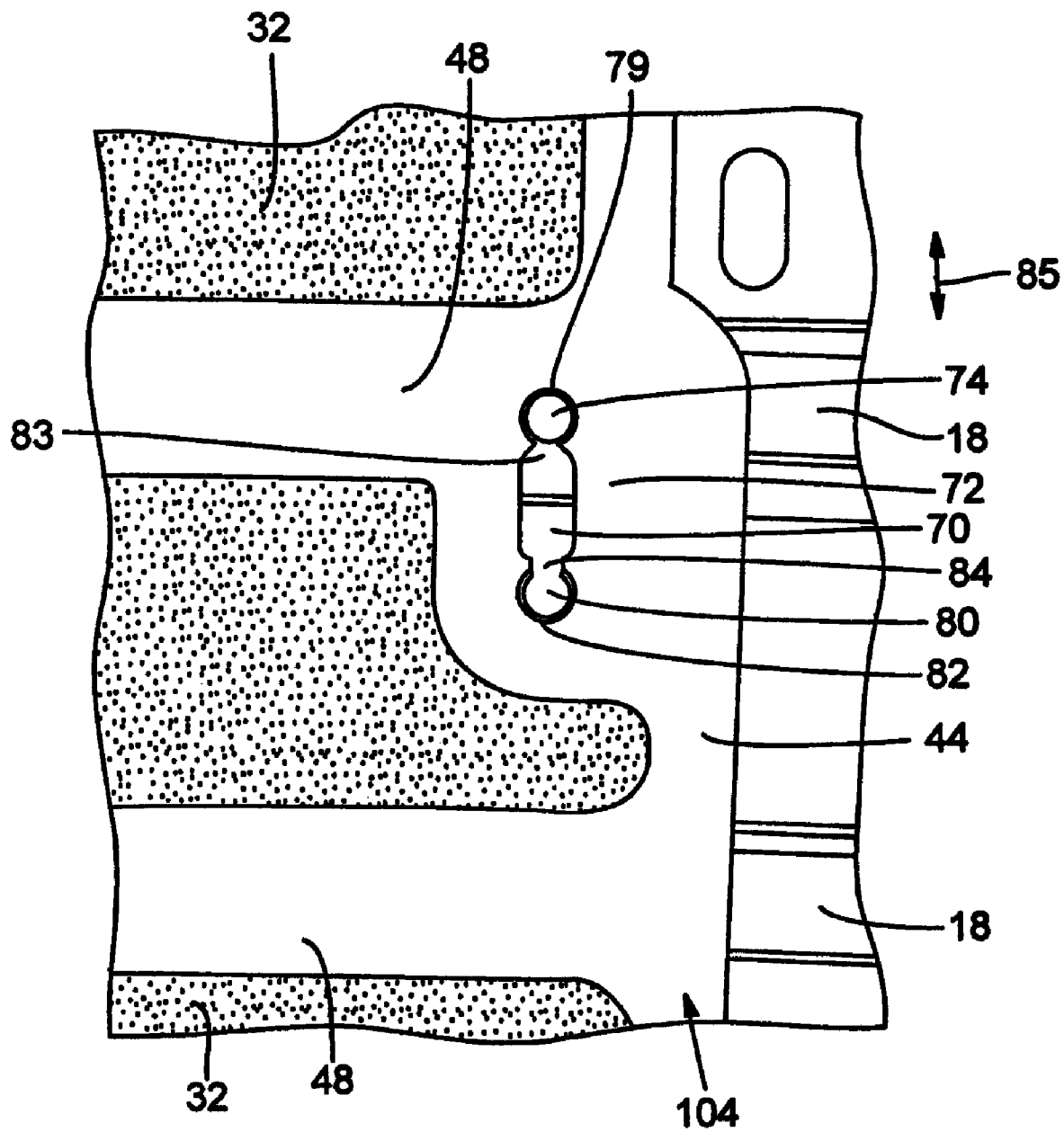
FIG. 5 is an enlarged view of a portion of the air flow regulator of FIG. 4 and illustrates one exemplary approach for mounting the air flow regulator in place while permitting the air flow regulator to slide between open and closed positions.

In FIG. 5, the bug screen 32 is shown stippled while the air flow regulator 42 is shown unstippled. FIG. 5 illustrates the air flow regulator in a disengaged (grille open) position wherein the slats 48 are positioned behind associated grille bars 18. FIG. 5 also illustrates an exemplary mechanism for mounting the air flow regulator to the grille so as to permit sliding of the air flow regulator 42 between grille open (disengaged) and grille opening at least partially blocking (engaged) positions. In particular, in accordance with the mechanism of FIG. 5, a slide slot 70, oriented in an upright orientation in this embodiment, is provided within an enlarged mounting portion 72 of air flow regulator 42. Typically, four such slots are provided with each being adjacent to a respective one of the corners of the air flow regulator. A support, such as a shaft of a bolt or stud 74, projects outwardly from the grille or other vehicle structure and into a circular opening 79 at the upper end of the slot 72. Although not shown in FIG. 5, bolt 74 may have an enlarged head so as to retain the air flow regulator in position. Both the upper and lower portions of the slot are desirably provided with a respective generally circular shaft receiving opening 79,80 that is desirably bounded by a rattle reducing material, such as rubber 82. The opening 84 leading into the circular opening 80 is necked down or reduced to match the diameter of the shaft or to be slightly greater than such shaft diameter. An opening 83 leading to circular opening 79 is also desirably necked down or reduced in the same manner. The air flow regulator may be shifted upwardly and downwardly in the direction of arrow 85. Since in FIG. 5 the air flow regulator 42 is shown in its lowered position with shaft 74 in opening 70, the air flow regulator 42 can be shifted upwardly from the position shown in FIG. 5. When shifted upwardly, eventually the air flow regulator travels relative to the shaft of bolt 74 such that the neck opening 84 travels past the shaft and the shaft is positioned within the lower opening 80. The air flow regulator is moved in the opposite direction at times when it is desired to open the grille opening (disengage the air flow regulator) and shift the air flow regulator to the position shown in FIG. 5. The air flow regulator can be shifted to plural open positions rather than between a closed and maximum open position, if desired.

FIG. 6 illustrates the slats 48 of a central portion of the air flow regulator in a disengaged or open position. The air flow regulator slats 48, in this example, are hidden or positioned at least partially, and more desirably entirely, behind the respective grille bars 18.

A grille closure shifting or drive mechanism, such as a motor or actuator and associated linkage or couplers, can be selectively operated to shift the air flow regulator between engaged and disengaged positions. The selective control of the air flow regulator in response to one or more vehicle operating conditions (which may include one or more environmental conditions, such as ambient temperature, in which the vehicle is being operated) is described by way of examples below.

Figure 6B:
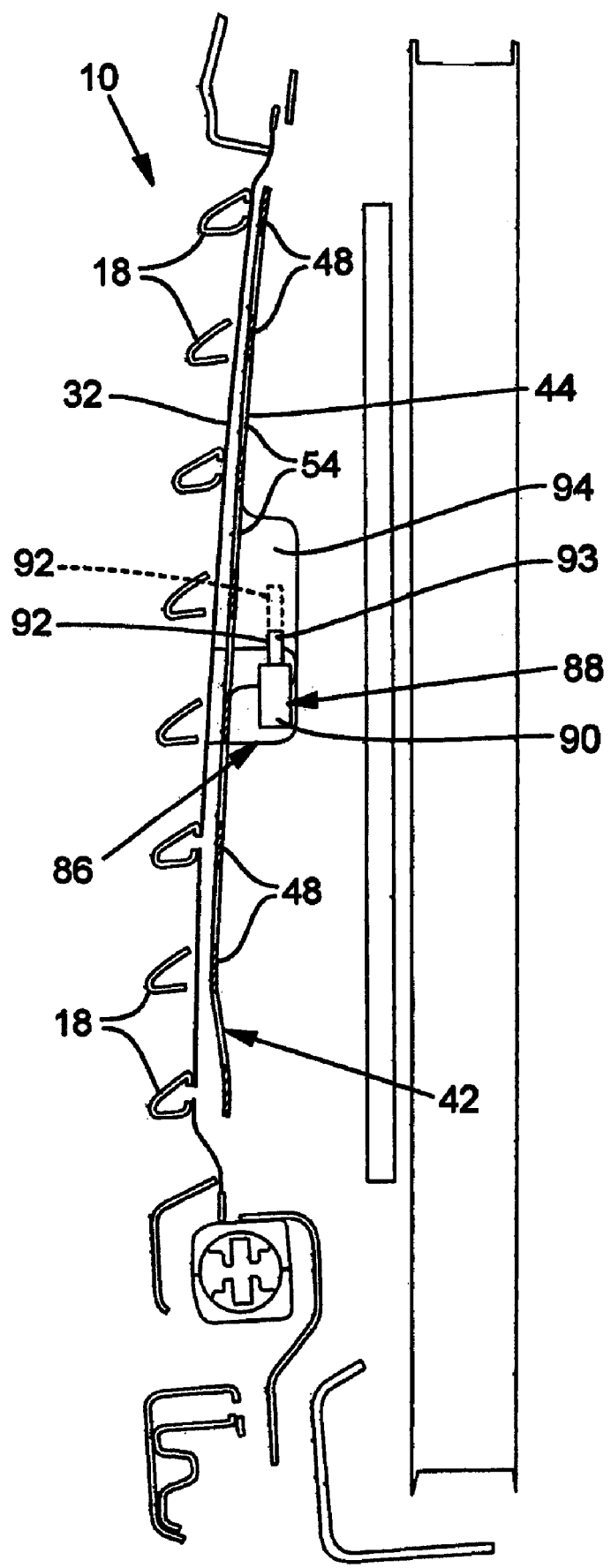
FIG. 6B is an enlarged view of a grille closing mechanism of the form shown in FIG. 6A.

An exemplary mechanism for shifting the air flow regulator 42 between engaged and disengaged positions is shown in FIG. 6A. In this figure, an actuator support bracket 86 is mounted to, for example, the grille. An actuator 88 is carried by bracket 86. For example, actuator 88 may comprise a solenoid with a housing 90 and an actuating rod 92 that shifts upwardly and downwardly in response to the application of power to the solenoid. The solenoid 88 may be single action or double action. In one desirable construction, the solenoid rod is 92 is biased to the retracted position and is extended in response to power being applied to the solenoid. Solenoid rod 92 is shown in solid lines in a retracted position in FIG. 6A and in dashed lines in an extended position. The solenoid rod 92 is pivoted at 93 to a flange 94 that projects inwardly into the engine compartment from the side section 44 of the air flow regulator 42. The air flow regulator 42 and flange 94 can, for example, be of an integral monolithic molded or stamped and bent construction. A similar actuator can be provided at the opposite side of the air flow regulator 42. Alternatively, a single actuator can be provided. The exemplary actuator of FIG. 6A is shown in greater detail in FIG. 6B.

Returning again to FIG. 1, the illustrated front of the vehicle comprises a bumper 100 having one or more bumper openings such as centrally positioned bumper opening 102 bounded by a bumper opening surround 104. Surround 104 comprises side portions 106,108 and upper and lower portions 110,112. Upright bumper reinforcing portions 116,118 extend between upper and lower portions 110,112 in this example.

In accordance with this disclosure, a mechanism is provided for selectively closing, either partially or entirely, and more desirably substantially entirely, the bumper opening such as opening 102. In the illustrated embodiment, a bumper closure member, which can be of varying shapes and construction, such as baffle or flap 120, is shifted to a position overlying opening 102 (and behind the opening in this case) to selectively close the opening. The closing of flap 120 can be controlled in response to vehicle operating conditions. FIG. 6 shows the flap 120 shifted to a closed position.

Figure 7:
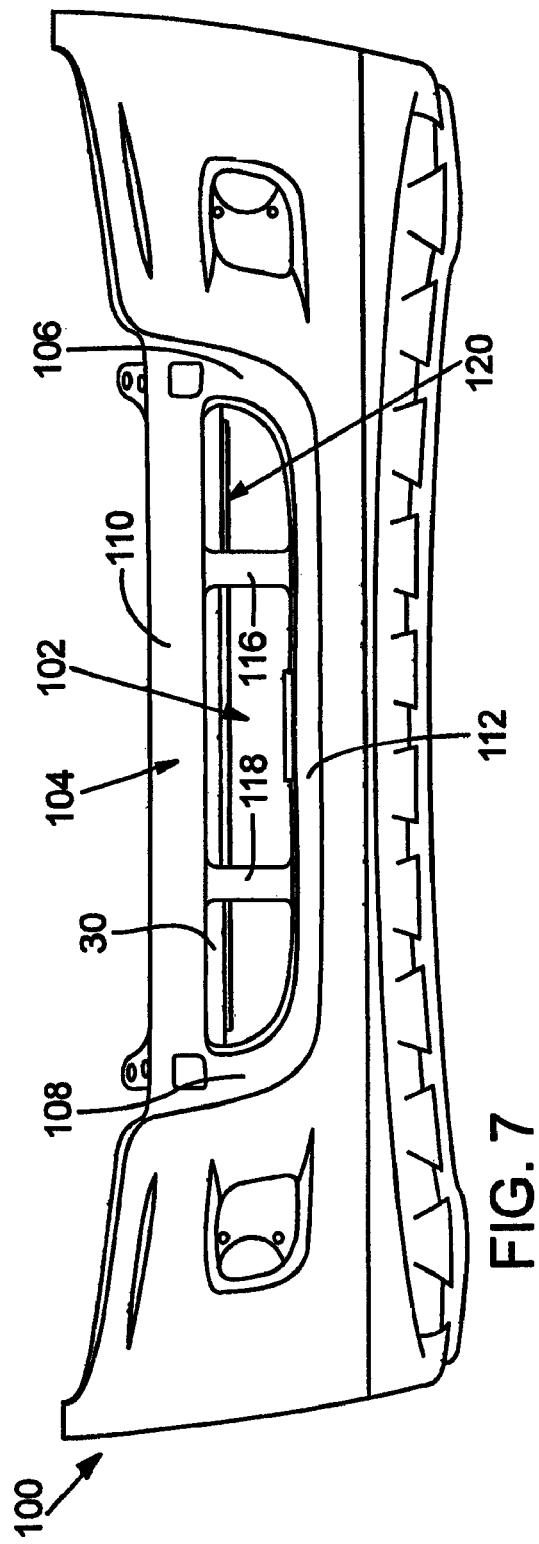
FIG. 7 is a front view of a form of a bumper of FIG. 1 with an exemplary form of bumper closing mechanism shown disengaged or in a bumper open position.
Figure 8:
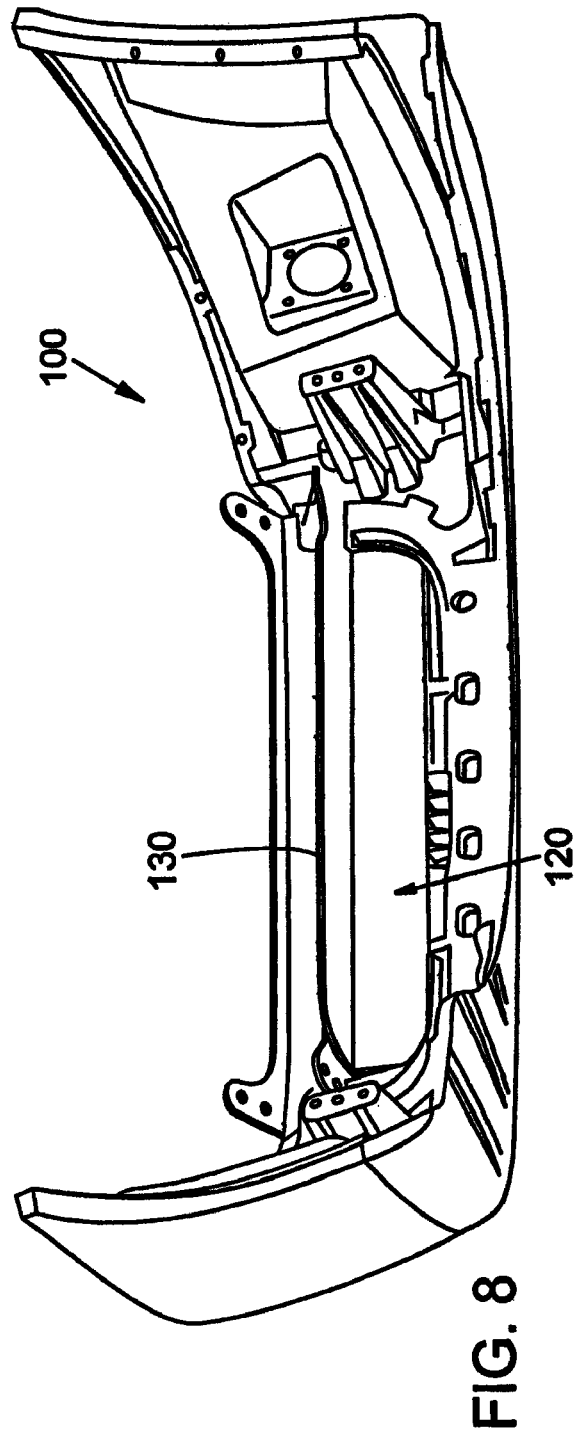
FIG. 8 is a rear view of the bumper of FIG. 7 with the bumper closing mechanism shown in a closed or engaged position to at least partially close or overlie the bumper opening.

FIG. 7 illustrates the bumper 100 with opening 102 open, that is, substantially unblocked by flap 120. FIG. 8 illustrates a rear view of the bumper 100 with flap 120 shown in a closed position. FIG. 8 also illustrates a chassis cross member 130, in this case extending along the full length of the opening 102 and along the upper edge of the opening, against which flap 120 can be positioned when the flap 120 is shifted to a disengaged or bumper open position such as shown in FIG. 7. The chassis cross member in this example provides a stop that limits the motion of the flap. Other alternative forms of a stop may be used. A bumper closure mechanism, such as a solenoid, motor or other sliding or pivoting mechanism, is desirably used to shift a closure member such as flap 120 into the desired position. In the embodiment shown in FIG. 8, the flap 120 is pivoted between upper (open) and downwardly (closed) positions in response to engine operating conditions.

Figure 6C:
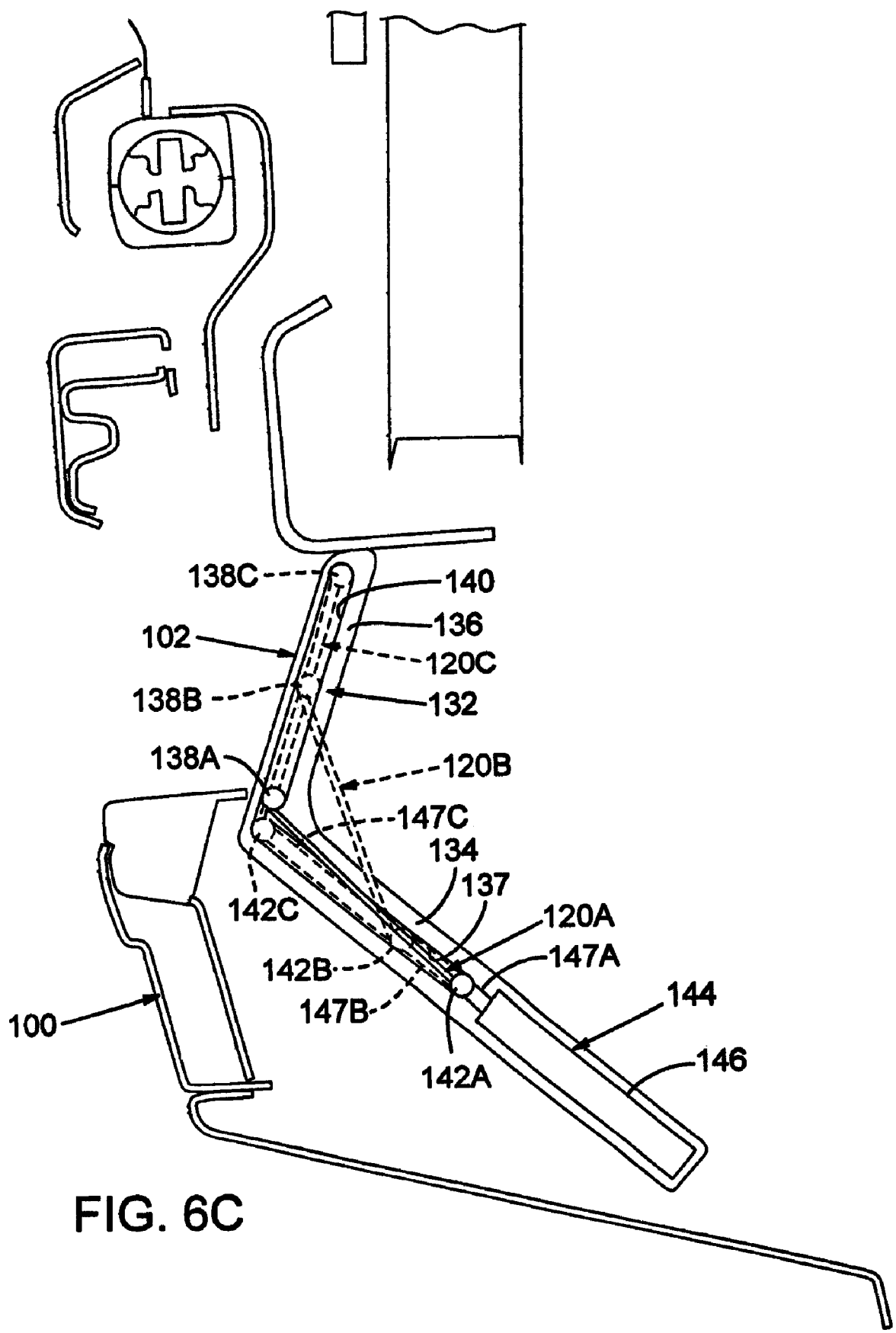
FIG. 6C is an enlarged view of a bumper closing mechanism of the form shown in FIG. 6A.

In the embodiment of FIGS. 6A and 6C, a sliding bumper closure member is used.

The exemplary mechanism for operating the flap 120 shown in FIG. 6A will next be described with reference to FIG. 6C. FIG. 6C illustrates the baffle 120 in a fully open or disengaged position, as shown in solid lines (designated 120A) with components in this position shown in solid lines and designated by the letter A following the component number. The baffle 120 is shown in dashed lines (designated 120B) in a first intermediate position, with components in this position being shown in dashed lines and designated by the letter B following the component member. When in the intermediate position B, the baffle 120B is shown being shifted toward an engaged or bumper opening closed position. The baffle 120 is also shown in a closed position (designated 120C), with components in this position shown in dashed lines and designated by a number followed by the letter C. As the baffle shifts between positions 120A and 120C, and vice versa, the motion of the baffle is guided by respective support brackets adjacent to each of the ends of the baffle. One such support bracket is indicated at 132 in FIG. 6C. The illustrated bracket 132 is generally angular with lower and upper leg portions 134,136. Leg portion 134 defines a first baffle guiding groove 137. Leg portion 136 defines a second baffle guiding groove 140. The upper end portion 138 of baffle 120 is provided with a bracket coupling portion inserted into the groove 140 so as to travel in the groove and retain the upper end of the baffle. In addition, the lower end 142 of baffle 120 comprises a coupling portion that is inserted into and guided by groove 137 to guide the movement of the lower edge of the baffle. Three positions 138A, 138B and 138C are indicated for baffle portion 138 in FIG. 6C. Three positions 142A, 142B and 142C are also indicated for baffle portion 142 in FIG. 6C. These positions correspond to the movement of the baffle 120 from its open position 120A, to its intermediate position 120B and to its engaged or bumper opening closed position 120C. Bearings, bushings, rollers or other guides can be carried by the end of the baffle 120 at 138 and 142 with the bearings, bushings, rollers or other guides traveling within or along the grooves 137,140. The grooves can be shaped to capture the rollers or other guides. The baffles can have folded upper and lower edges that define respective upper and lower pin receiving channels along the respective upper and lower edges of the baffle 120. Guide pins can be inserted through such channels with respective ends of the guide pins being positioned within the grooves 137,140 defined by bracket 132 and corresponding grooves defined by another bracket (not shown in FIG. 6C) mounted at the opposite end of the bumper opening. This other bracket may be a mirror image, for example, of the bracket 132. Rollers, bushings or other guides can be mounted to the ends of such pins. An actuator such as solenoid 144 is provided for shifting the baffle 120 between the open and closed positions.

An exemplary solenoid 144 can comprise a housing portion 146 and a solenoid rod portion 147. The upper end of the rod portion is coupled in this example to the lower edge of the baffle. Three rod positions for rod portion 147 are shown in FIG. 6C and indicated by 147A, 147B and 147C, corresponding to the baffle being at respective positions 120A, 120B and 120C. Actuator 144 can be a double-actuating solenoid or can be biased to a closed position (the 147A position) until powered to shift the baffle 120 to the open position 120C.

Other actuators can be used to adjust and vary the extent to which the respective grille and bumper openings are open rather than actuators which shift the respective air flow regulator 42 and baffle 120 between two positions (open and closed). Such actuators can comprise motors, pneumatic cylinders or other forms of actuators.

Figure 9:
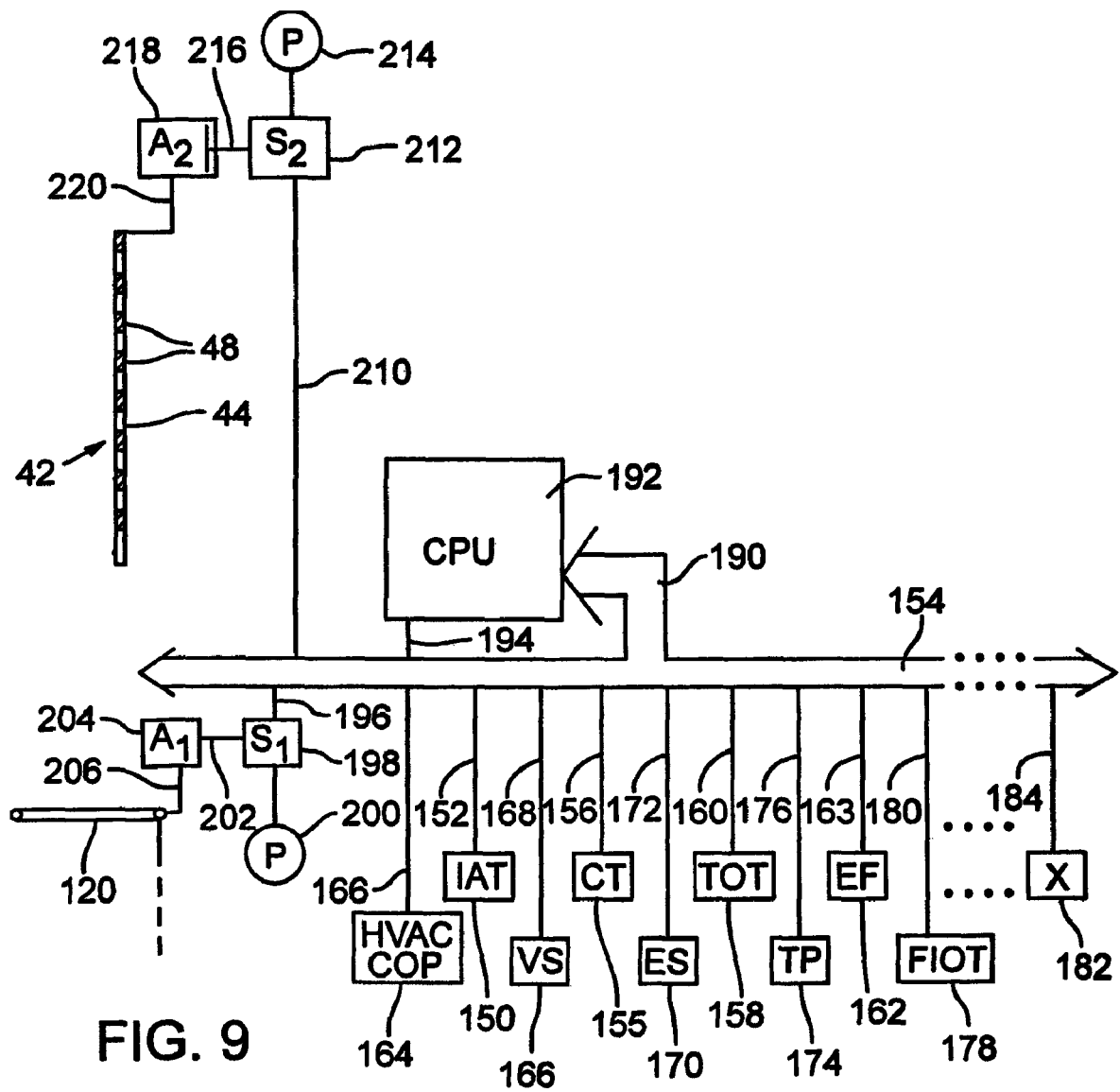
FIG. 9 illustrates an exemplary circuit and control mechanism for grille and/or bumper closing mechanisms.

FIG. 9 illustrates an exemplary control mechanism for the air flow regulator 42 and closure member 120.

With reference to FIG. 9, a number of vehicle operating parameters or conditions are determined. For example, intake air temperature (IAT) can be determined, such as by a sensor 150 that provides a data signal representing the air intake temperature (e.g., the ambient air temperature) along a line 152 to a vehicle databus 154; a coolant temperature sensor (CT) 155 that provides a signal via a line 156 to databus 154 representing the temperature of coolant in the vehicle (e.g., radiator fluid temperature) in the case of a fluid cooled vehicle; a turbocharger out temperature sensor (TOT) 158 that produces a signal on a line 160 to databus 154 representing the temperature at the turbocharger air output of a turbocharger equipped vehicle; an engine fan (on/off detector) sensor (EF) 162 providing a signal on line 163 to databus 154 indicating whether a vehicle fan used to cool, for example, a radiator of the vehicle is on or off (the condition of the engine fan alternatively may be determined by monitoring signals delivered along databus 154 to start and/or stop the fan); an HVAC compressor-out pressure sensor (HVAC COP) 164 for providing a signal on line 166 to the databus 154 indicating the air conditioning compressor output pressure and thus whether demand at the air compressor, for example, is in excess of a threshold; a vehicle speed sensor (VS) 166 for providing a signal along line 168 to databus 154 indicating the vehicle speed; an engine speed sensor (ES) 170 for providing a signal along a line 172 to databus 154 indicating the engine speed; a throttle position sensor (TP) 174 providing a signal on a line 176 to the databus 154 that indicates the position of the fuel supply throttle (e.g., foot pedal) of the vehicle; and a fuel injector open time (FIOT) sensor 178 (which may alternatively comprise a timer in an electronic control unit that times the duration of the time that fuel injectors are open during a firing cycle) for providing a signal on a line 180 to bus 154 indicating the duration fuel injectors are open during a piston firing cycle and thus indicating fuel usage. One or more other sensors 182 can also be included for providing signals on respective signal lines, such as represented by line 184, that represent other vehicle operating conditions that may be taken into account in determining whether to open or close the respective closure member 120 and grille air flow regulator 42. Fewer conditions may also be monitored. Many of these sensors are already provided on a truck for providing such signals to a databus for purposes other than controlling the operation of bumper and/or grille opening closure mechanisms.

These data signals can be delivered via a bus 190 to a CPU 192 which can be an existing computer on the vehicle, such as an engine control unit (ECU). CPU 192 provides one or more signals via line 194 to the databus for use in controlling the operation of actuators for the respective closure member such as flap 120 and air flow regulator 42. Alternatively, the CPU can be wired directly to such actuators and/or to the sensors, although this is less desirable.

For example, a first signal can be provided on line 194 and via line 196 to a switch 198 ($S_1$) for controlling the delivery of power from a source 200 (P) to a bumper closure member actuator. When switch 198 is closed, power from source 200 is delivered via a line 202 to the actuator 204 ($A_1$). Actuator $A_1$ (which may be, for example, a motor or solenoid 144) controls the operation of the flap to shift the flap between open and closed positions in response to the state of the signal on line 196. The number 206 in FIG. 9 refers to structure for coupling the actuator 204 to the baffle or flap 120. In addition, another signal can be delivered from CPU 192 via line 194 and bus 154 and via a line 210 to a second switch 212 (S2). Switch 212, when closed, delivers power from a source 214 (P) (sources 214 and 200 may, for example, be a common battery of the vehicle). In response to the appropriate signal from the CPU, switch 212 is closed and power is provided to an actuator 218 (A2). Actuator A2 (which may, for example, be a motor or solenoid such as solenoid 88 in FIG. 6A) controls the operation of the air flow regulator 42 between open and closed positions in response to the control signal. The number 220 in FIG. 9 refers to structure for coupling the actuator to the air flow regulator 42.

A common control signal may be used for actuating and operating both the grille air flow regulator and bumper flap. However, a separate control signal is desirable as conditions can exist where it is desirable, for example, to open the grille opening while the bumper opening is closed.

Figure 10:
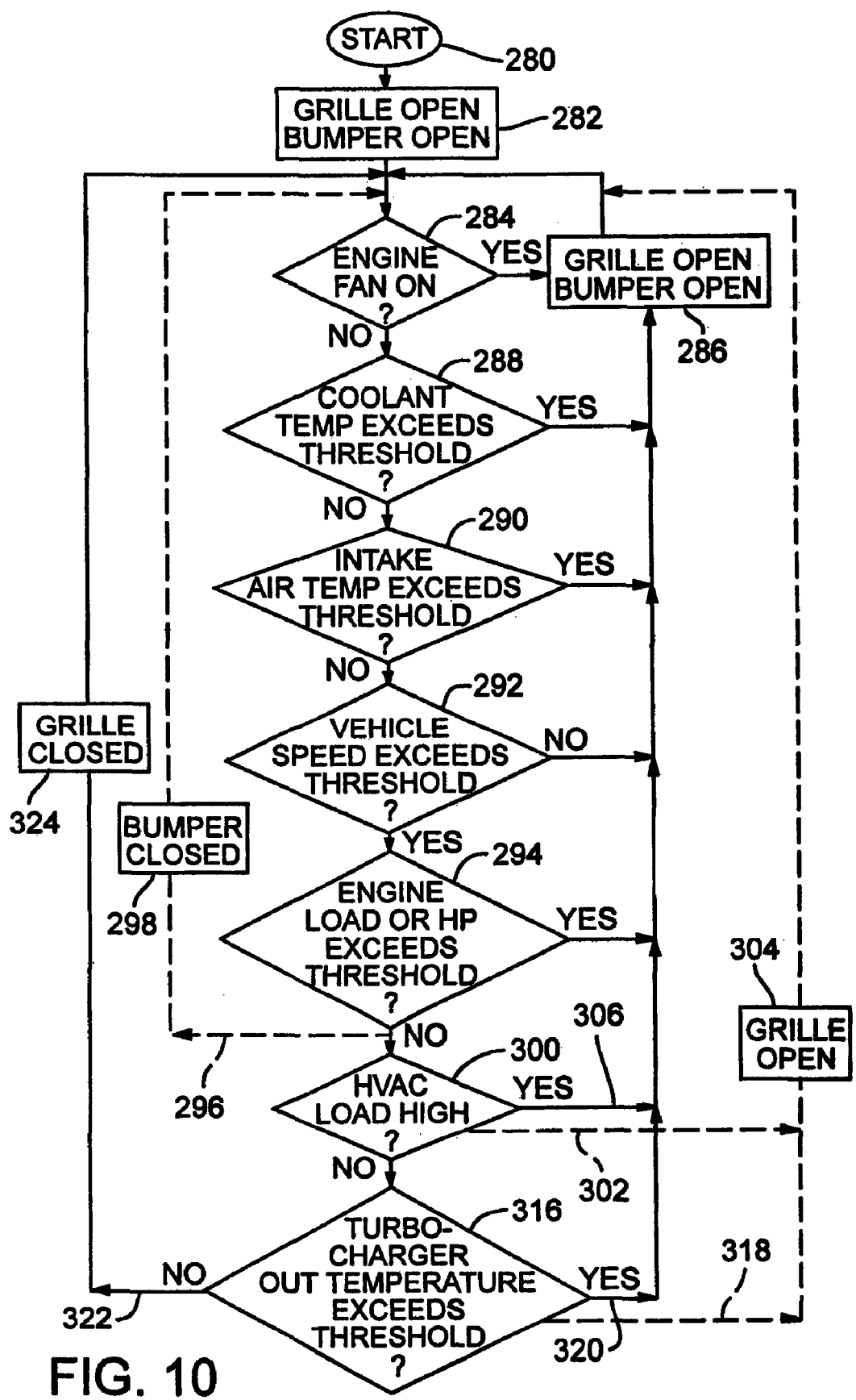
FIG. 10 is an exemplary flow chart of a program that may be used by a computer in controlling the operation of the grille and/or bumper closure mechanisms.

Although the algorithms used in controlling these members can be varied, and combinations of sensed conditions can be used to control the closure mechanisms, one exemplary algorithm for controlling the operation of grille and bumper closing members is illustrated in FIG. 10. In FIG. 10 at block 280, the sequence starts. At block 282, for reference purposes, the grille is open and the bumper is open (e.g., the grille and bumper closure members are both in an open position, e.g., in one embodiment described above the air flow regulator slats 42 are hidden behind the grille bars 18 and the bumper closure member 120 does not overlie and close the bumper opening). At block 284, a determination is made of whether the engine fan is on. If yes, a block 286 is reached and the grille and bumper both remain open. The process returns to block 284 with this loop continuing until the engine fan is determined no longer to be on. The engine fan is typically on when additional cooling of the engine is desired and at such times closing of the grille and bumper openings can interfere with this cooling. Monitoring the status of the engine fan provides a backup check of the conditions being determined by the coolant temperature sensor and compressor out pressure sensor (transducer). Assuming the engine fan is off, a block 288 is reached wherein it is determined whether the coolant temperature exceeds a threshold. This threshold is desirably below the temperature at which the engine fan turns on. For example, assume the fan turns on at 215° F., the threshold may be set at 210° F. If the fan were to turn on while the bumper and grille closure members are closed, this can negate fuel efficiency benefits as the fan requires significant power (e.g., 40 horsepower for a fan for a semi-tractor truck). If the answer is yes, the block 286 is reached from block 288 and the grille and bumper remain open.

If the answer at block 288 is no, a block 290 is reached and a determination is made as to whether the intake air temperature exceeds a threshold. If, for example, the ambient air temperature is in excess of 80° F. or some other threshold, then the entire cooling capacity may be needed and the closure members can be kept open. If the answer at block 290 is yes, the ambient air temperature is high. In this case, block 286 is again reached and the grille remains open and the bumper remains open. If the air intake temperature is below the threshold, the no branch from block 290 is followed to block 292. At block 292 a determination is made as to whether the vehicle speed exceeds a threshold. If the answer is no (e.g., the vehicle is idling or is traveling at low speed), the grille and bumper are desirably both kept open as block 286 is again reached. For example, the speed threshold may be 30 mph. Since drag is a function of vehicle speed, at low speeds lesser benefits result from closing the grille and bumper openings so that one can keep them open to improve engine cooling without much loss of fuel efficiency due to wind drag. As one example of how these parameters can be combined, assume the coolant temperature determined at block 288 is within a first range (below the threshold) and the vehicle speed at block 292 is in excess of a first threshold, the bumper and grille can be closed. In contrast, if the coolant temperature is within a second range that is higher than the first range but still less than the threshold, the grille and bumper can be maintained open even though the vehicle speed exceeds the first threshold. In this case, the openings can be closed if the vehicle speed exceeds a second threshold.

If the answer at block 292 is yes, a block 294 is reached. At block 294, a determination is made of whether the engine load or horsepower exceeds a threshold. The engine load may be approximated from the injector on time and throttle position with each parameter providing a proxy for use in estimating the engine load. In addition, the horsepower can be determined as an approximation of a scalar times the product of the engine speed and engine load. Engine load and horsepower usage can be used to provide an estimate of heat loads on the radiator and charge air cooler. At block 294, if the engine load exceeds a threshold, the grille and bumper both remain open. If the answer from block 294 is no, a dashed line path 296 may be followed to block 298 with the bumper opening being closed under these conditions. The process then returns to block 284. Note: In the flow chart of FIG. 10, the grille has remained open even though path 296 has been followed and the bumper opening has closed. Path 296 is an optional path as, for example, the grille and bumper conditions can alternatively be controlled by a single control signal with both being opened and closed under the same conditions.

In connection with the flow chart of FIG. 10, from block 294, a block 300 is reached via the no branch from block 294 and a determination is made as to whether the HVAC operation is at a high load (e.g., the HVAC compressor-out pressure is monitored to see if high). The HVAC compressor in some known truck configurations triggers the fan to turn on if the compressor-out pressure exceeds a threshold (e.g., 325 psig±15 psi). If the compressor-out pressure exceeds a threshold (e.g., above 300 psi), the HVAC operation may be deemed at high load so that desirably at least the grille is kept open. If the answer at block 300 is yes (and assuming dashed line path 296 is in place), a dashed line path 302 can be followed to a block 304 and the grille remains open. Block 286 is bypassed in this case because the bumper remains closed via path 296. On the other hand, if path 296 has been eliminated, the solid line 306 is followed from block 300 (if the HVAC is at high load) to block 286 and both the grille and bumper remain open. If the HVAC is at high load, it is desirable to have the grille open to provide more air for cooling the air conditioning condenser. However, the bumper can be closed as closing the bumper opening does not significantly impact any air flow to the air conditioning condenser.

From block 300, a block 316 is reached via the no branch from block 300 at which it is determined whether the turbocharger output temperature exceeds a threshold. Monitoring this temperature provides an indication of anticipated heat loading in the charge air cooler. If the turbocharger-out temperature exceeds a threshold, desirably at least the grille remains open to allow the charge air cooler to function at maximum cooling capacity. If the answer at block 316 is yes and optional path 296 has been included, dashed line path 318 is followed to block 304 and the grille opening remains open even though the bumper opening is closed via block 298. Closing the bumper opening has minimal impact on delivery of air to the turbocharger and thus the bumper opening can be closed even though the turbocharger output temperature is high. On the other hand, it is desirable under these conditions to leave the grille open (assuming other vehicle operating parameters are not sufficient to counter this decision) to provide additional cooling air for the turbocharger. Assuming path 296 is not included, in this case, solid line 320 is followed from the yes decision of block 316 (in the event the turbocharger out temperature is high) to block 286 and the grille and bumper remain open. If, at block 316, the turbocharger output temperature does not exceed the threshold, a path 322 is followed (via the no decision from block 316) to a block 324 and the grille opening is at least partially closed, for example by shifting the air flow regulator to a position where it at least partially closes the gaps between the grille bars.

Figure 11:
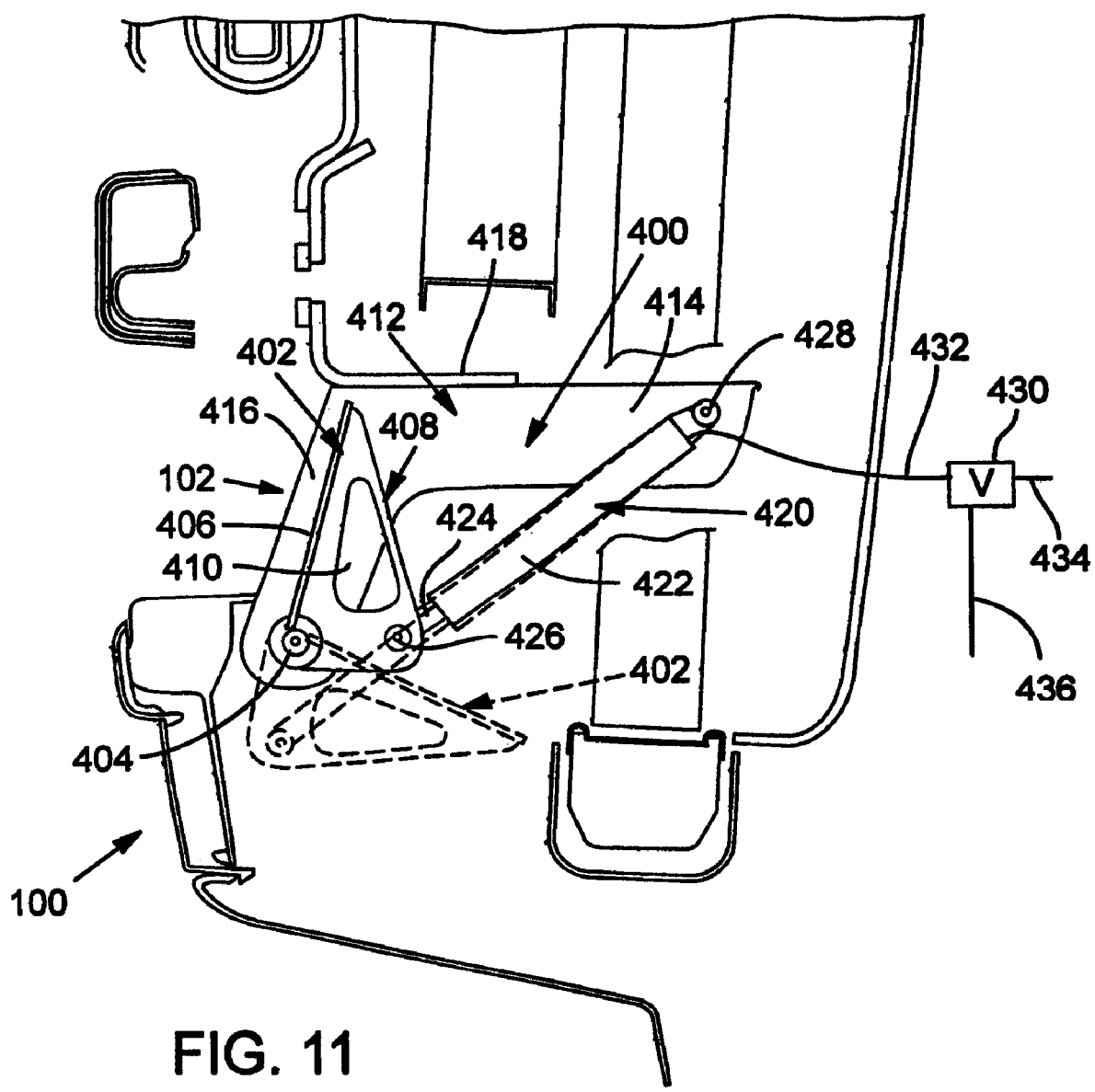
FIG. 11 is a partial sectional view of a portion of a bumper closure mechanism of an alternative form.

FIG. 11 illustrates an alternative form of bumper opening closure mechanism. In FIG. 11, the bumper 100 is illustrated with an exemplary bumper opening 102. The illustrated form of bumper closure mechanism is indicated generally at 400 in FIG. 11. In this embodiment, a closure member 402 is pivotally supported for pivoting about an elongated transversely extending axis 404 between open and closed positions. The closure member is shown in a closed position in solid lines in FIG. 11 and in an open position in dashed lines in this figure. More specifically, the embodiment of closure member 402 shown in this figure comprises a baffle portion 406 that is desirably sized and shaped to substantially close the entire bumper opening 102 when the baffle is shifted to the closed position. In addition, reinforcing elements, such as first and second spaced apart generally triangular members 408 (which may have a removed area 410 for weight saving purposes), comprise one form of baffle reinforcing structure. A bracket 412, which can be generally angular in construction with a first generally horizontally extending leg portion 414 and a second downwardly projecting leg portion 416 can be mounted to the vehicle, such as to a support element 418. A similar bracket (not shown in FIG. 11) can be positioned at the opposite side of the bumper opening 102. Pivot 404 is coupled to a lower position of bracket leg portion 416 and is also coupled to the corresponding leg portion of the opposed bracket (not shown in this figure). In this description, the term "coupled to" encompasses direct connection of two components and indirect connection through one or more other components.

A baffle actuator is also provided for shifting the baffle between open and closed positions. In the exemplary form shown, the baffle actuator comprises a cylinder 420 comprising a cylinder housing portion 422 and a rod portion 424. The distal end of rod portion 424 is pivoted at 426 to reinforcement 408 with pivot 426 being spaced from pivot 404. The cylinder housing 422 is pivoted at 428 to the leg portion 414 of bracket 412. As cylinder rod 424 is extended (e.g., to its dashed line position shown in FIG. 11), the cylinder 420 causes closure member 402 to pivot about pivot axis 404 from the closed to the open position. Desirably, a similar cylinder is provided at the opposite end of the closure member. Although cylinder 420 can be hydraulic and other forms of actuators may be used, desirably the cylinder 420 comprises a pneumatic cylinder. As a specific example, the cylinder may be biased (e.g., by a spring) to the extended position in which case closure member 402 opens the bumper opening. In response to control signals, such as dependant upon vehicle-operating conditions (which can include environmental conditions) a valve 430 is opened. Pressurized air from a source is then provided via line 434 and through the valve 430 and a line 432 to the cylinder 420 so as to cause the rod 424 to contract and shift the closure member 406 to a bumper opening closed position. When desired to shift the closure member to an open position, valve 430 is controlled to shut off the passageway for pressurized air from line 434 to line 432. In addition, line 432 is vented, such as via a vent passageway through the valve 430. Control signals for controlling the operation of the valve may be delivered via conductor 436 to the valve 430, which in this example, can comprise a solenoid controlled valve.

Figure 12:
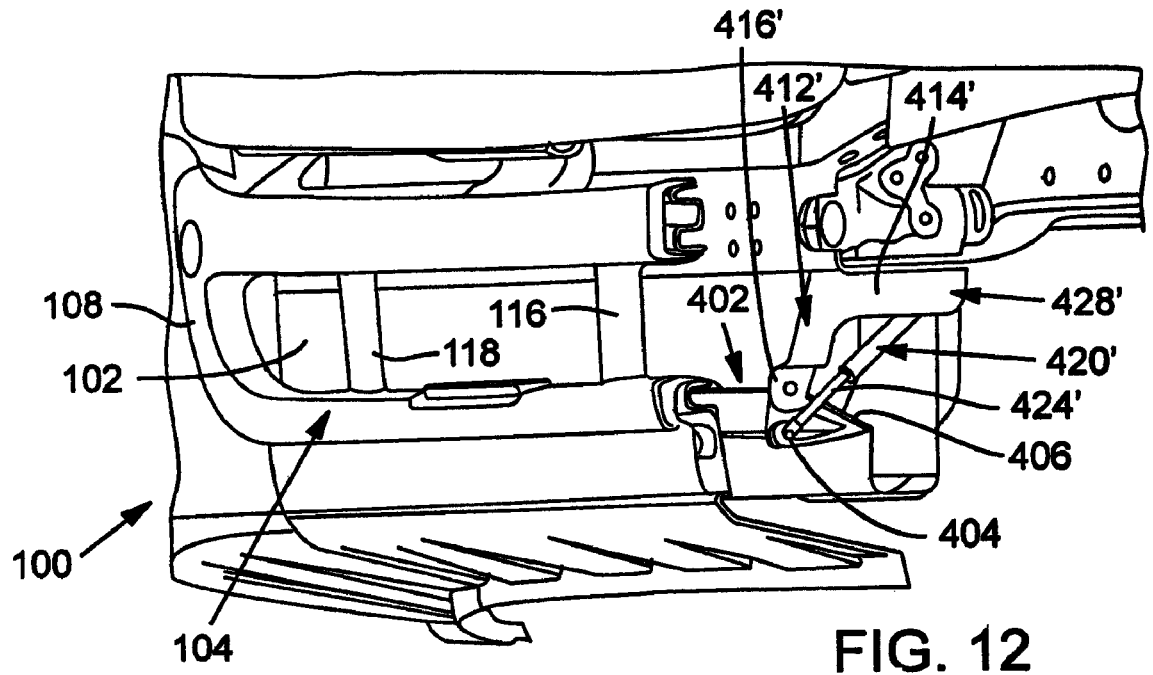
FIG. 12 is a partially broken away view of the embodiment of FIG. 11 with a bumper closing mechanism shown in an open position.
Figure 13:
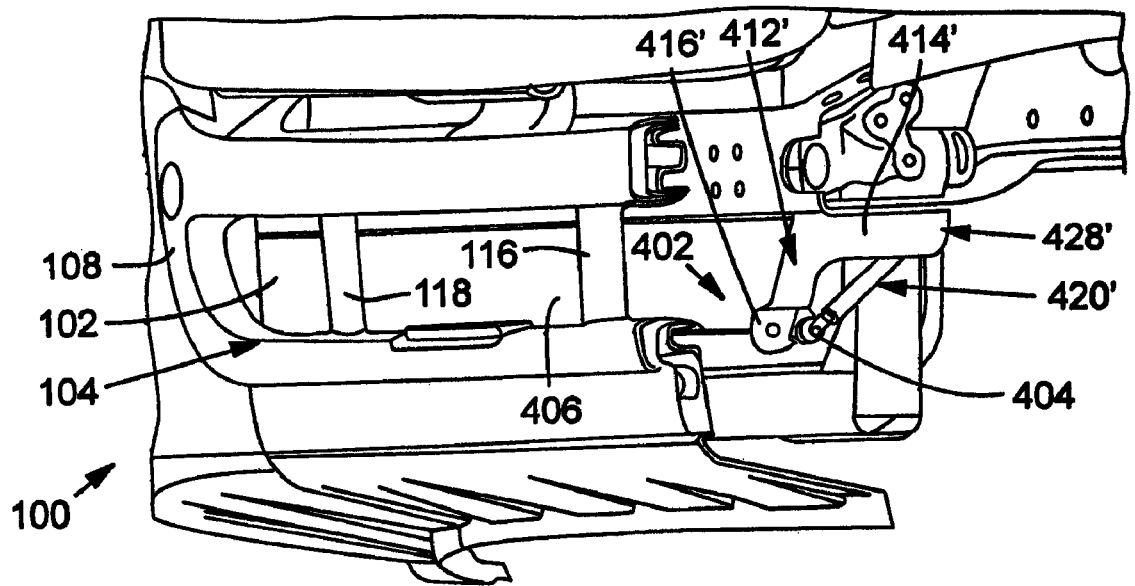
FIG. 13 is a view similar to FIG. 12 with the bumper opening closure mechanism shown in a closed position.

FIGS. 12 and 13 illustrate closure member 402 in respectively open and closed positions. Selected components depicted in FIGS. 12 and 13 have been given the same number as in FIG. 11, but with a prime designation since these components are at the opposite end of the closure member from the cylinder 420 and bracket 412 shown in FIG. 11.

Figure 14:
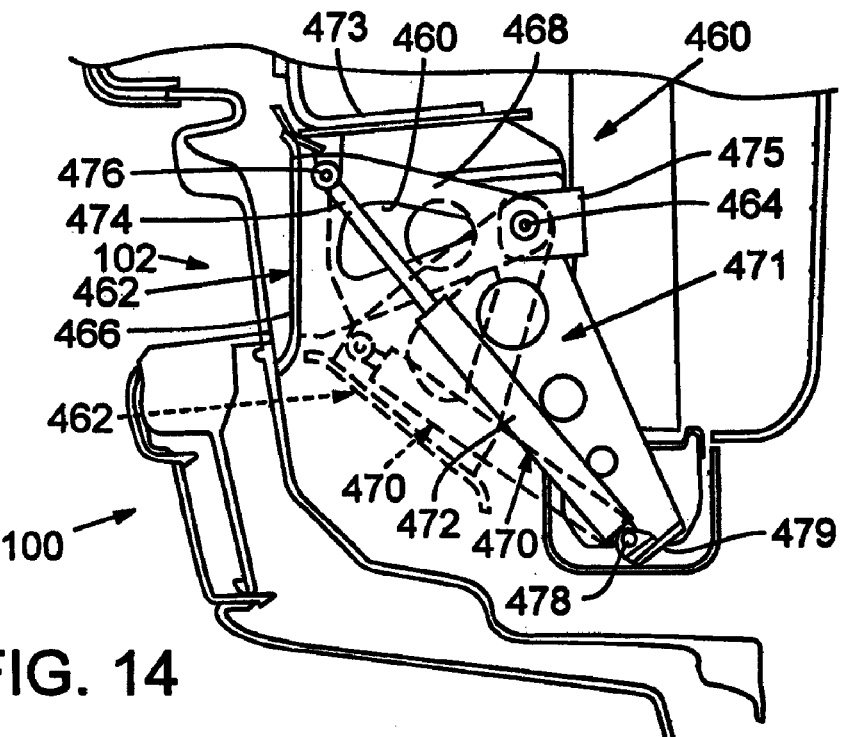
FIG. 14 is a partial sectional view of another form of bumper closure mechanism.
Figure 14A:
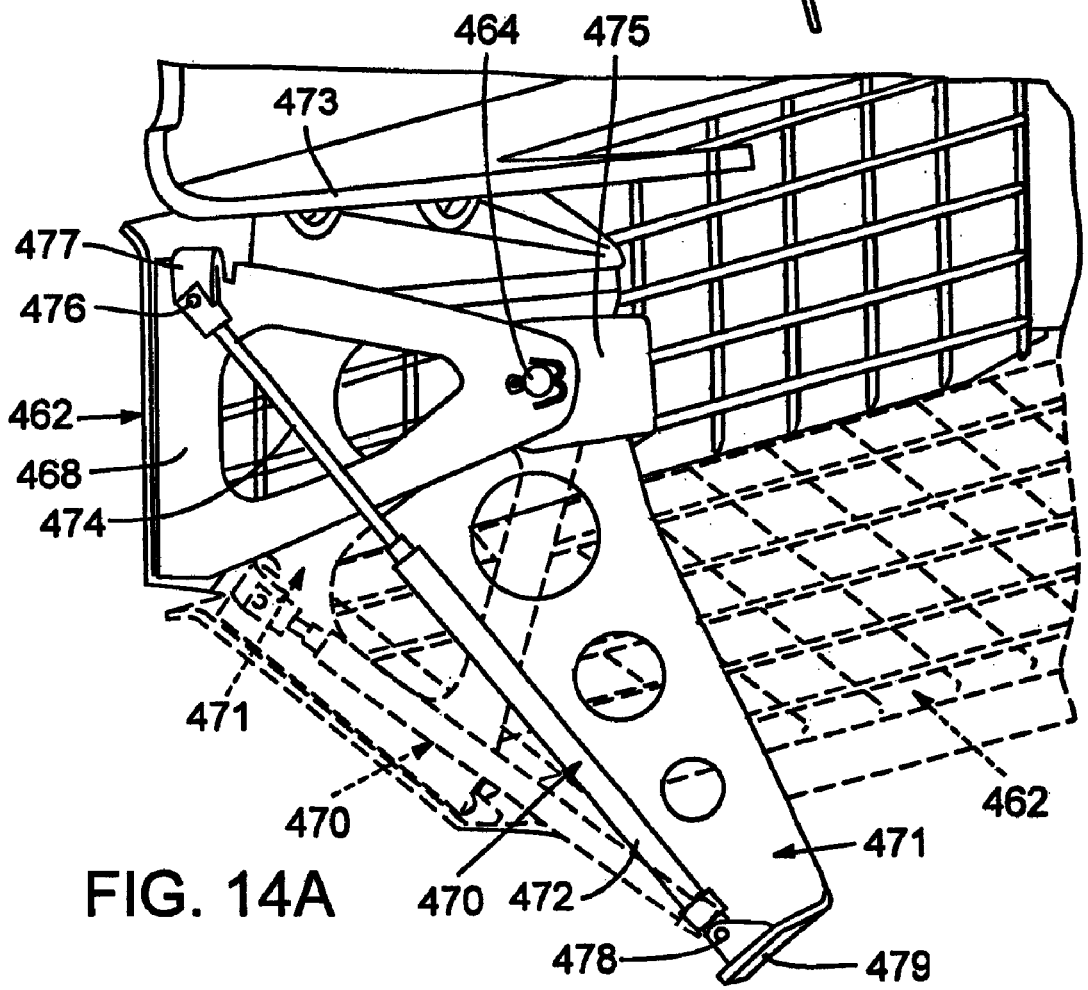
FIG. 14A is a partially broken-away perspective view of the embodiment of FIG. 14.

FIG. 14 illustrates yet another form of exemplary bumper opening closure mechanism. In FIG. 14, the bumper 100 is illustrated with an exemplary bumper opening 102. The illustrated form of bumper closure mechanism is indicated generally at 460 in FIG. 14. In this embodiment, a closure member 462 is pivotally supported for pivoting about an elongated transversely extending axis 464 between opened and closed positions. The closure member is shown in a closed position in solid lines in FIG. 14 and in an opened position in dashed lines in this figure. More specifically, the embodiment of the closure member 462 shown in this figure comprises a baffle portion 466 that is desirably sized and shaped to substantially close the entire bumper opening 102 when the baffle is shifted to the closed position. In addition, reinforcing elements, such as first and second spaced apart generally triangular members 468 (which may have a removed area 460 for weight saving purposes), comprise one form of baffle reinforcing structure. One of these triangular members 468 is shown in FIG. 14. A bracket 471, which can be generally a triangular construction with cut out areas for weight saving purposes can be mounted to the vehicle such as to a support element 473. A similar bracket (not shown in FIG. 14) can be positioned to the opposite side of the bumper opening 102 from the side depicted in FIG. 14. A stand off support 475, which can be a portion of bracket 471, provides structure to which closure member 462 can be pivoted for pivoting about the pivot axis 464. A baffle or closure member actuator is also provided for shifting the closure member between open and closed positions. In the form shown, the baffle actuator comprises a cylinder 470 comprising a cylinder housing portion 472 and a rod portion 474. The distal end of rod portion 474 is pivoted at 476 to a flange portion 477 of reinforcement 468 with pivot 476 being spaced from pivot 464. The cylinder housing 472 is pivoted at 478 to a projecting leg portion 479 of bracket 471. As cylinder rod 474 is retracted (e.g., to its dashed line position shown in FIG. 14A), the cylinder 470 causes closure member 462 to pivot about pivot axis 464 from the closed to the opened position. Desirably a like cylinder and other components are provided at the opposite end of the closure member. Although cylinder 470 can be hydraulic and other forms of actuators can be used, desirably the cylinder 470 comprises a pneumatic cylinder. As a specific example, the cylinder can be biased (e.g., by a spring) to the one position, such as to the retracted position, in which case closure member 462 opens the bumper opening. In response to control signals, such as dependent upon vehicle operating conditions (that can include environmental conditions), the cylinder operation can be controlled, such as described above, to control the opening and closing of the bumper opening.

Thus, the embodiment of FIG. 14 operates in the manner of the embodiment of FIG. 11. However, the position of the pivots 476, 478 and 464 are desirably shifted to reduce the throw (extent of extension and retraction) of the piston in comparison to the throw of the embodiment of FIG. 11.

Figure 15:
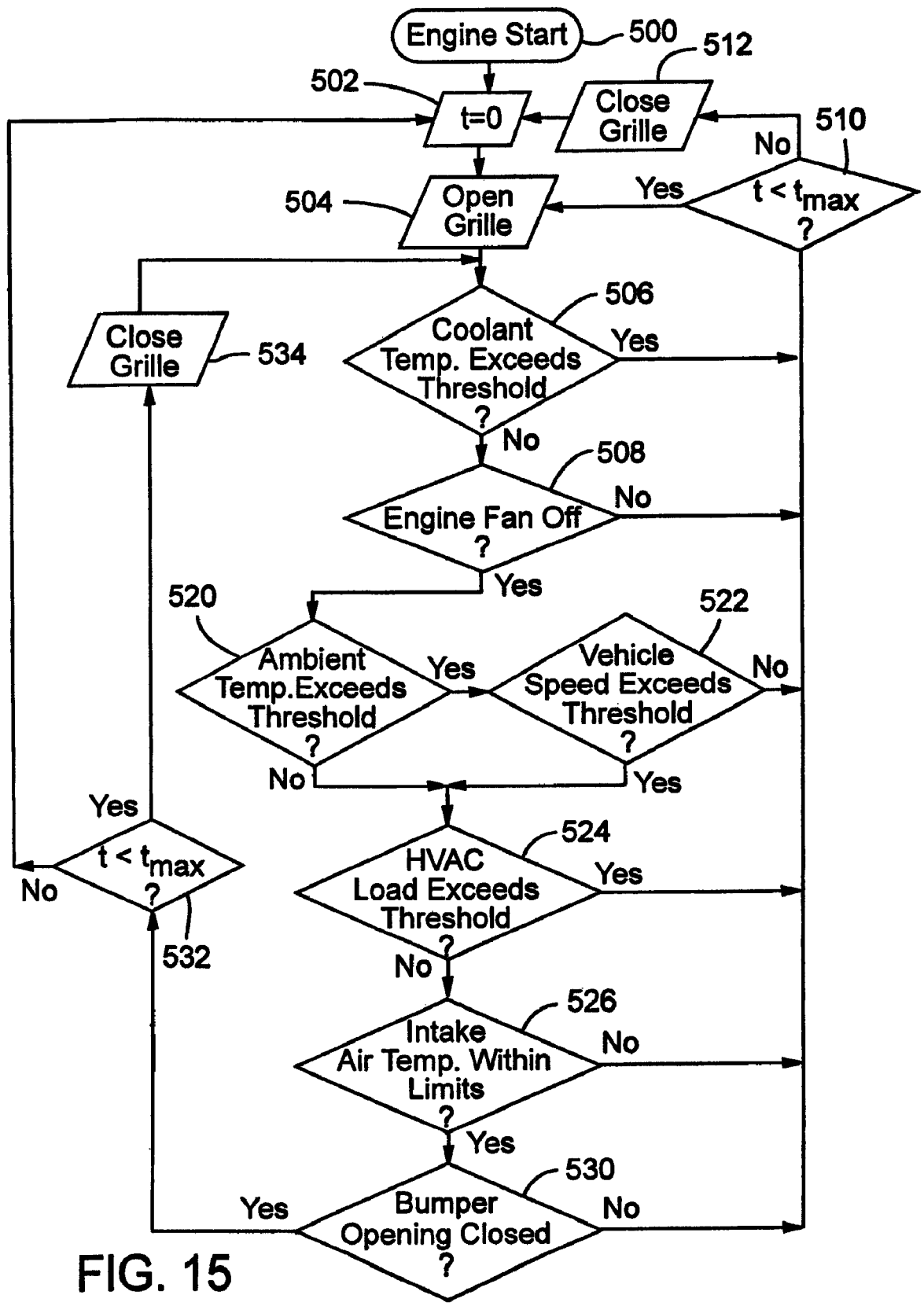
FIG. 15 illustrates a flow chart of an alternative method of controlling the opening and closure of a grille opening.

An alternative method for controlling the position of the grille is shown in FIG. 15. With reference to this figure, at block 500 assume the engine has been started. From block 500 a block 502 is reached where the time t is set equal to 0. From block 502, a block 504 is reached and the grille is open. From block 504, a determination is made at block 506 as to whether the coolant temperature exceeds a threshold. If the engine has just started, most likely the coolant temperature will not exceed the threshold and the no branch will be followed from block 506 to a block 508. Assuming at block 506 a determination is made that the coolant temperature exceeds the threshold, the "yes" branch from block 506 is followed to a block 510, at which a determination is made as to whether the time is less than a maximum time $t_{max}$. For example, although variable, $t_{max}$ may be set at five minutes. If t is less than $t_{max}$, the "yes" branch is followed from block 510 to block 504 and the grille remains open. On the other hand, if t is greater than or equal to $t_{max}$, the "no" branch is followed from block 510 to a block 512 and the grille is closed. From block 512, block 502 is again reached where t is reset to 0 and the grille is opened at block 504. Thus, under these conditions, the grille has been cycled between opened and closed positions. This option is advantageous as it assists in cleaning out dust and ice from the grille areas that may otherwise build up if the grille remained constantly in one position.

Assuming that block 508 is reached from block 506. At block 508 a determination is made whether the engine fan is on or off. If on, the "no" branch from block 508 is followed to block 510 and the process proceeds as previously described. In contrast, assume the engine fan is determined to be "off" at block 508. In this case, the "yes" branch is followed from block 508 to a block 520 at which a determination is made as to whether the ambient temperature (e.g., the outside air temperature) is greater than a threshold. If the answer is yes at block 520 (e.g., it is a warm day), the yes branch is followed from block 520 to a block 522 at which a determination is made as to whether the vehicle speed exceeds a threshold. If the answer is "no", from block 522 the block 510 is again reached. In this case, it is a warm day and the vehicle is traveling slowly or idling so that it is desirable to maintain the grille in an open position (e.g., via the "yes" block from 510) except when temporarily recycling the grille closed for cleaning purposes. There is little aerodynamic benefit from closing the grille when the vehicle is traveling at low speeds.

Assume at block 520 a determination is made that the ambient temperature does not exceed the threshold. In this case, the "no" branch of block 520 is followed to block 524 at which a determination is made as to whether the HVAC load exceeds a threshold. Block 524 is also reached from block 522 in the event the vehicle speed exceeds a threshold. If at block 524 a determination is made that the HVAC load exceeds a threshold, the "yes" branch is followed from this block to block 510 and the grille is maintained open except during temporarily closing times (e.g., via block 512). Under high HVAC loads, it can generally be desirable to maintain the grille open.

Assuming the HVAC load does not exceed the threshold and the other conditions have been met such that the "no" branch is followed from block 524, in this case a block 526 is reached. A determination is made at block 526 as to whether the intake air temperature (see for example sensor 150 in FIG. 9) is within desirable limits. If no (e.g., the intake air temperature is too hot), block 510 is again reached and the grille is open via block 504 except during temporary closing times (via block 512). On the other hand, if the intake air temperature is within the desirable limits, the "yes" branch is followed from block 526 to a block 530. Block 530 is an optional block (it being understood that the system may or may not have all of the blocks previously discussed as well as additional blocks), that is used when the bumper controller is not independent of the grille controller. At block 530 a determination is made as to whether the bumper opening is closed. If the answer is "no" (the bumper opening is open), block 510 is reached from block 530 and the grille is again maintained open except during temporary closing times via block 512. On the other hand, if the bumper opening is closed, from block 530 the "yes" branch is followed from this block to another block 532. At block 532 a determination is made as to whether the time is less than the maximum time such as $t_{max}$. If the answer is yes, a block 534 is reached and the grille is closed. From block 534 the block 506 is again reached and the process continues. If the conditions remain unchanged, the grille will remain closed (as is the bumper opening) until at block 532 a determination is made that the time is equal to $t_{max}$. When this happens, the "no" branch from block 532 is followed to the block 502, the time is reset to zero, and the grille is opened at block 504. Assuming conditions remain unchanged, when block 534 is again reached, the grille will be closed and it will remain closed until such time as the conditions change or $t=t_{max}$ at block 532. Thus, again the grille is temporarily shifted from one position to another (in this case, from a closed condition to an open condition) which again assists in maintaining the grille opening and closing structure in cleaned (e.g., dust and ice removed) conditions.

Figure 16:
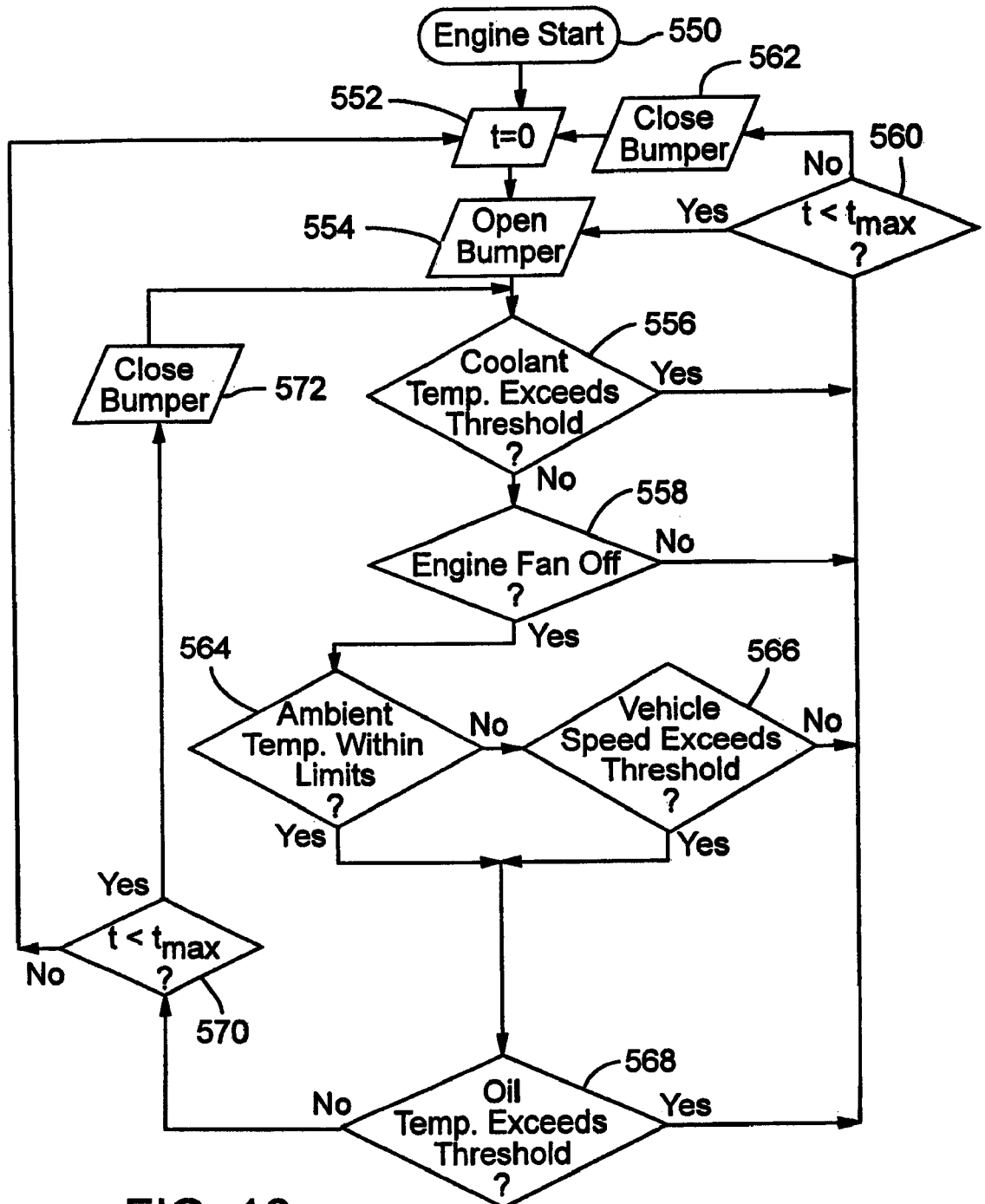
FIG. 16 is a flow chart illustrating an alternative approach for controlling the opening and closing of a bumper opening.

FIG. 16 illustrates an alternative approach for controlling the operation of the bumper closing mechanism. In FIG. 16, at block 550, assume the engine is started. At block 552 the time t is set equal to zero. From block 552, a block 554 is reached and the bumper opening is opened. From block 554, a block 556 is reached at which a determination is made as to whether the coolant temperature exceeds a threshold. If the answer is "no", a block 558 is reached and a determination is made as to whether the engine fan is off. In contrast, at block 556, if a determination is made that the coolant temperature exceeds the threshold, the "yes" branch from block 556 is followed to a block 560 and a determination is made as to whether the time t is less than the maximum time such as $t_{max}$. If the answer is "yes" at block 560, block 554 is again reached and the bumper remains open. In contrast, if at block 560 a determination is made that t is equal to $t_{max}$ (e.g., no longer less than $t_{max}$), the "no" branch is followed from block 560 to a block 562 and the bumper opening is closed. From block 562 the block 552 is reached with t again being reset to t=zero. Block 554 is again reached and the bumper opening is opened. If the conditions have not changed, the bumper will remain open with the path following blocks 554 to 556 to 560 to 554 until such time as t is no longer less than $t_{max}$ when block 562 is again reached. Thus, in this optional example, the bumper is periodically and temporarily closed under these conditions to assist in maintaining the bumper actuating structure clean and operable (e.g., free of dirt and ice).

If at block 558 a determination is made that the engine fan is not off, the "no" branch from this block is followed to block 560 and the process proceeds as explained above. In contrast, if at block 558 a determination is made that the engine fan is on, the "yes" branch is followed from block 558 to block 564. At block 564 a determination is made as to whether the ambient temperature is within limits. For example, whether the ambient temperature is at or above a first temperature and at or below a second temperature. If the answer is "no" at block 564, a block 566 is reached and a determination is made as to whether the vehicle speed exceeds the threshold. If the answer is "no" at block 566, the block 560 is reached. On the other hand, a "yes" answer at either of the blocks 564 and 566 causes the process to reach a block 568 at which a determination is made as to whether the oil temperature exceeds a threshold. If the answer is "yes", the block 560 is again reached as it is desirable to keep the bumper open via block 554 under these conditions except at times when temporarily closed (e.g., from block 560 to block 562).

In contrast, if at block 568 a determination is made that the oil temperature does not exceed the threshold (e.g., the oil is not too hot), the "no" branch is followed from block 568 to a block 570. At block 570 a determination is made as to whether t is less than a maximum time such as $t_{max}$. If the answer is "yes", a block 572 is reached from block 570 and the bumper opening is closed. From block 572, the block 556 is reached. The process will continue to cycle through block 572 with the bumper opening remaining closed. Assuming no changes in the monitored process conditions, this path will be followed until, at block 570, a determination is made that t is not less than $t_{max}$ (e.g., t is equal to or exceeds $t_{max}$). In this case, at block 570, the "no" branch is followed from this block to block 552. From block 552, the block 554 is reached and the bumper is opened. The "no" branch from block 570 thus results in temporary operation of the bumper closing mechanism to open the bumper opening to maintain the mechanism clean (e.g., free of dirt and dust). Assuming no conditions have changed (other than t being reset to zero at block 552), eventually the process will again reach block 572 and the bumper will again be closed. The bumper will remain closed until such time as the monitored process conditions change or t is no longer less than $t_{max}$ at block 570.

The method of controlling the bumper and grille opening closure mechanisms is not limited to the approaches described in FIGS. 10, 15 and 16. In addition, questions such as whether a parameter exceeds a threshold also encompass the parameter being equal to or greater than the threshold. Likewise, a question as to whether a parameter is within limits is to be interpreted to encompass the parameter being between the limits as well as being equal to one or both extremes of the limits. Moreover, a determination of whether t is less than $t_{max}$ is to be interpreted to include t being not greater than or equal to $t_{max}$.

By closing the bumper opening and at least partially closing the grille opening, reductions in drag and efficiencies in fuel usage result. In wind tunnel testing of Freightliner Century Class® vehicles, closing of the entire grille produced approximately a seven percent reduction in drag and closing of the entire bumper opening produced approximately a three percent reduction in drag. These overall reductions in drag would be reduced if only one-half or another partial portion of the grille opening is selectively blocked. These results of the selective blocking were observed at a wind tunnel operation corresponding to a 60 miles per hour vehicle cruising speed. This would result in an estimated one to one and one-half percent increase in fuel efficiency at such speeds.

Other forms of closure mechanisms may be used to selectively overlie all or portions of the bumper and grille openings. Also, either the bumper closure mechanism, or the grille closure mechanism, or both, may be included in a vehicle. Other variations will also be obvious to those of ordinary skill in the art and are included herein.

Having illustrated and described the principles of this invention with reference to several desirable embodiments, it should be apparent to those of ordinary skill in the art that the invention may be modified in arrangement and detail without departing from the inventive principles disclosed herein. We claim as our invention all such novel and non-obvious aspects of the methods and structures disclosed herein, both alone and in various combinations and sub-combinations with one another and all modifications thereof which fall within the scope and spirit of the following claims.

We claim:

1. A method of controlling the flow of air through at least one vehicle opening, the at least one vehicle opening comprising at least one of a grille opening and a bumper opening, the method comprising:
   sensing at least one vehicle operating parameter;
   providing at least one parameter representing signal on a data bus representing the at least one vehicle operating parameter;
   determining from said at least one parameter representing signal whether an adjustment in the extent to which the at least one opening is open to the air flow is to be made in response to the at least one signal;
   providing a control signal on the data bus to cause the adjustment of the extent to which the at least one opening is open in the event the act of determining indicates that an adjustment is to be made;
   wherein the sensed at least one vehicle operating parameter comprises the vehicle speed and at least one additional vehicle operating parameter; and
   wherein the at least one opening is controlled to be closed substantially continuously while the vehicle speed is above a threshold speed and at least one additional vehicle operating parameter and at least one environmental condition in which the vehicle is operated are not at respective conditions indicating that the opening should not be closed.

2. A method according to claim 1 wherein
   at least one additional vehicle operating parameter comprises an air conditioning compressor output pressure;
   providing at least one parameter representing signal on a data bus representing the air conditioning compressor output pressure;
   determining whether said air conditioning compressor output pressure exceeds a threshold;
   providing a control signal on the data bus to cause at least the grill opening to remain open or be opened in the event the air compressor output pressure exceeds the threshold.

3. A method according to claim 2 wherein the sensed at least one additional vehicle operating parameter comprises at least one additional vehicle operating parameter in addition to the air conditioning output pressure.

4. A method according to claim 2 wherein the at least one additional vehicle operating parameter that is sensed further comprises a turbo charger output temperature, the at least one parameter representing signal on the data bus further including a signal representing the turbo charger output temperature.

5. A method according to claim 2 comprising providing the control signal on the data bus to at least one actuator operable in response to the control signal to adjust the position of an air flow restricting member that controls the air flow through the at least one opening.

6. A method according to claim 1 wherein the vehicle comprises at least one grille opening through a grill of the vehicle and at least one bumper opening through a bumper of the vehicle, the method comprising sensing plural vehicle operating parameters, providing parameter representing signals on the data bus representing the plural vehicle operating parameters, determining from the parameter representing signals whether at least one set of vehicle operating parameters is met for which the bumper opening is to be open while the grille opening is to be closed and providing at least one control signal on the data bus to cause opening of the grille opening and closing of the bumper opening upon the occurrence of said at least one set of vehicle operating parameters.

7. A method according to claim 1 wherein the vehicle comprises at least one grille opening through a grill of the vehicle and at least one bumper opening through a bumper of the vehicle, the method comprising providing control signals to selectively adjust the extent to which the bumper opening is open independently of the extent to which the grille opening is open under at least certain combinations of sensed vehicle operating parameters.

8. A method of controlling the flow of air through at least one vehicle opening, the at least one vehicle opening comprising at least one of a grille opening and a bumper opening, the method comprising:
   sensing at least one vehicle operating parameter;
   providing at least one parameter representing signal on a data bus representing the at least one vehicle operating parameter;
   determining from said at least one parameter representing signal whether an adjustment in the extent to which the at least one opening is open to the air flow is to be made in response to the at least one signal;
   providing a control signal on the data bus to cause the adjustment of the extent to which the at least one opening is open in the event the act of determining indicates that an adjustment is to be made; and
   wherein the at least one vehicle operating parameter comprises whether an engine fan is on or off and wherein the at least one opening is controlled to be open at least a majority of the time when the engine fan is on.

9. A method of controlling the flow of air through at least one vehicle opening, the at least one vehicle opening comprising at least one of a grille opening and a bumper opening, the method comprising:
   sensing at least one vehicle operating parameter;
   providing at least one parameter representing signal on a data bus representing the at least one vehicle operating parameter;
   determining from said at least one parameter representing signal whether an adjustment in the extent to which the at least one opening is open to the air flow is to be made in response to the at least one signal;
   providing a control signal on the data bus to cause the adjustment of the extent to which the at least one opening is open in the event the act of determining indicates that an adjustment is to be made; the act of providing a control signal comprising providing the control signal on the data bus to at least one actuator operable in response to the control signal to adjust the position of an air flow restricting member that controls the air flow through the at least one opening and also comprising providing a control signal on the data bus to the at least one actuator to cause an adjustment of the position of the air flow restricting member in the event the air flow restricting member has remained in one position for a threshold time period.

10. A method of controlling the air flow through at least one opening located at a front portion of a vehicle comprising:
    sensing at least a speed of the vehicle;
    sensing at least one other vehicle operating condition or an environmental condition; and
    restricting the flow of air through the air flow opening in the event the speed is at least at a first value greater than a first threshold unless the at least one other vehicle operating condition or environmental condition is at a value indicating that the flow of air through the air flow opening is not to be restricted;
    wherein the at least one other vehicle operating condition is whether an engine fan for the vehicle is on and wherein the flow of air through the air flow opening is not restricted for at least a majority of the time that the engine fan is on.

11. A method according to claim 10 comprising the act of adjusting the position of an air flow restrictor to accomplish the act of restricting the flow of air.

12. A method of controlling the air flow through at least one opening located at a front portion of a vehicle comprising:
    sensing at least a speed of the vehicle;
    sensing at least one other vehicle operating condition or an environmental condition;
    restricting the flow of air through the air flow opening in the event the speed is at least at a first value greater than a first threshold unless the at least one other vehicle operating condition or environmental condition is at a value indicating that the flow of air through the air flow opening is not to be restricted;
    comprising the act of adjusting the position of an air flow restrictor to accomplish the act of restricting the flow of air; and
    comprising the act of temporarily moving the position of the air flow restrictor regardless of the vehicle speed and regardless of the value of said at least one other environmental condition or vehicle operating condition in the event the air flow restrictor has been in one position for at least a threshold time period.

\* \* \* \* \*